US010167003B1

(12) United States Patent
Bilodeau

(10) Patent No.: US 10,167,003 B1
(45) Date of Patent: Jan. 1, 2019

(54) AUTOMATED RAIL INSPECTION SYSTEM

(71) Applicant: voestalpine SIGNALING USA Inc., Loveland, CO (US)

(72) Inventor: James R. Bilodeau, Loveland, CO (US)

(73) Assignee: voestalpine SIGNALING USA Inc., Loveland, CO (US)

( * ) Notice: Subject to any disclaimer, the term of this patent is extended or adjusted under 35 U.S.C. 154(b) by 0 days.

(21) Appl. No.: 15/156,034

(22) Filed: May 16, 2016

Related U.S. Application Data

(60) Provisional application No. 62/162,509, filed on May 15, 2015, provisional application No. 62/162,521, filed on May 15, 2015.

(51) Int. Cl.
| | | |
|---|---|---|
| *G01L 1/25* | (2006.01) | |
| *B61K 9/08* | (2006.01) | |
| *G01L 25/00* | (2006.01) | |
| *G01K 5/48* | (2006.01) | |
| *B61L 3/16* | (2006.01) | |

(52) U.S. Cl.
CPC .............. *B61K 9/08* (2013.01); *B61L 3/16* (2013.01); *G01K 5/48* (2013.01); *G01L 25/00* (2013.01)

(58) Field of Classification Search
CPC .. B61K 9/08; B61L 3/16; G01L 25/00; G01K 5/48
See application file for complete search history.

(56) References Cited

U.S. PATENT DOCUMENTS

| | | | |
|---|---|---|---|
| 7,392,117 B1 | 6/2008 | Bilodeau et al. | |
| 7,698,028 B1* | 4/2010 | Bilodeau | B61L 23/042 246/120 |
| 8,155,809 B1 | 4/2012 | Bilodeau et al. | |
| 2002/0111724 A1* | 8/2002 | Dembosky | B61F 5/383 701/19 |
| 2009/0056466 A1* | 3/2009 | Moran | G01G 3/1418 73/766 |
| 2012/0046811 A1* | 2/2012 | Murphy | B60T 17/221 701/19 |
| 2014/0316719 A1* | 10/2014 | Lanza di Scalea | G01M 5/0025 702/42 |
| 2015/0198502 A1* | 7/2015 | Phares | G01M 5/0066 702/42 |

OTHER PUBLICATIONS

Transportation, Development of Rail Neutral Temperature Monitoring Device, 2008.*
KOOB, The development of a vibration technique for estimation of neutral temperature in continuously welded railroad rail, 2003.*

* cited by examiner

*Primary Examiner* — John Breene
*Assistant Examiner* — Mohammad Islam
(74) *Attorney, Agent, or Firm* — Polsinelli PC

(57) ABSTRACT

The present disclosure provides an automated rail inspection system. The present disclosure also provides a method for calibrating a strain gage based neutral temperature measurement system.

8 Claims, 33 Drawing Sheets

AUTOMATED RAIL INSPECTION SYSTEM

CROSS REFERENCE TO RELATED APPLICATIONS

The present application claims priority to U.S. patent application No. 62/162,521, entitled "Automated Rail Inspection System," filed May 15, 2015, and also priority to U.S. patent application No. 62/162,509, entitled "Calibration Method for Strain Gage Based Neutral Temperature Measurement Systems," filed May 15, 2015, each of the above-mentioned applications is hereby incorporated by reference in its entirety into the present application.

All of the following Patent Applications are hereby incorporated by reference in their entireties into the present application.

U.S. patent application Ser. No. 12/716,247, filed Mar. 2, 2010, now U.S. Pat. No. 8,155,809, issued on Apr. 10, 2012.

U.S. patent application Ser. No. 12/138,617, filed Jun. 13, 2008, now U.S. Pat. No. 7,698,028, issued on Jun. 13, 2008.

U.S. patent application Ser. No. 10/979,870, filed Nov. 2, 2004, now U.S. Pat. No. 7,392,117, issued on Nov. 2, 2004.

FIELD

The present disclosure is directed to an automated rail inspection system. The present disclosure is also directed to a method for calibrating a strain gage based neutral temperature measurement system.

BACKGROUND

Neutral Temperature is a railroad term used to describe the amount of stress present in rail. The neutral temperature is the temperature at which the rail is neither in compression nor in tension. It is sometimes referred to as the stress-free temperature. Rail is made of steel and all steel expands as it heats up and contracts as it cools. As rail heats up past the neutral temperature, significant amounts of stress can build up in the rail. If enough stress builds up, the rail will buckle, this is commonly known as a sun-kink or rail buckle and is a major cause of train derailments worldwide. The opposite effect is when the rail contracts due to cooling too far below the neutral temperature causing rail breaks, also a major cause of derailments.

The problem that railroads face is there is no way to walk up to a piece of rail and know how much stress is present or what the neutral temperature currently is. There are sensors available that use standard strain gages and thermocouples to measure neutral temperature. Strain gages measure strain and from strain, stress can be computed using the modulus of elasticity, a material constant.

The major short-coming of strain gage based sensors is: Strain gages can only measure change in strain, in order to measure the absolute strain, they must be calibrated. In order to calibrate a strain gage, the current stress in the rail must be known. Once the current stress is known, an offset is calculated and applied to all future strain gage readings. The railroads have several methods by which they can determine the stress in the rail. 1) cut the rail, creating a stress-free condition or 2) using a device such as a Verse, a commercially available product that measures the stress in rail by picking it up with a cable and claw system and measuring how much force is required to move it. In order to use the Verse, the rail must be unclipped in 100 feet in each direction and the rail must also be in compression. Both of these methods are costly and time consuming for the railroads.

BRIEF SUMMARY

This disclosure describes various implementations of methods and/or systems relating to data logging, collection, and/or analysis techniques, as well as relating to other inventions disclosed herein. In one embodiment, the invention relates to a method of collecting and analyzing information relating to the condition of a particular structure. In another embodiment, the invention relates to a method of logging, collecting, and analyzing information relating to the condition of a particular structure, such as a continuously welded railway rail. Other features and uses of the systems, methods, and subject matter disclosed herein may be understood by reference to the full extent of this disclosure, including the following detailed description, the claims, any appendices, and the several drawings herein.

Aspects of the present disclosure involve a system for inspecting rails comprising an unmanned vehicle, a frame, a power system, a control system, a computer system, and a plurality of onboard control sensors and receivers. The vehicle is configured to run on the rails via wheels that are engaged with the rails. The power system is configured for providing power for the vehicle to run on the rails and may be battery operated or gas operated. The control system may control the operation of the vehicle which may be remotely actively operated or autonomous. The computer system may collect, store, and transmit data. The plurality of onboard control sensors and receivers may include an imaging device for providing images or video of the rails or surrounding areas, a GPS navigation device for calculating a geographical location of the vehicle, and other sensors and receivers configured to detect a condition of or near the rails, the condition comprising: rail geometry, rail profile, neutral temperature, and clearances near the rails.

Aspects of the present disclosure involve a method of calibrating a strain gage positioned on a rail for use in determining a neutral temperature measurement. The method may include sampling a strain measurement from the strain gage at a sampling rate to produce a plurality of strain measurements. The plurality of strain measurements may include a strain spike experienced when the rail transitions from tension to compression or compression to tension. The method may further include using a computer processing device to identify and calibrate the strain gage when the plurality of strain measurements indicates the strain spike.

The method may further include wherein calibrating is computing an offset value for the strain gage.

The method may further include wherein the sampling rate is about one sample every thirty seconds, one sample every twenty seconds, one sample every ten seconds, or one sample every minute.

The method may further include wherein the spike is an abnormality in strain that is not related to rail temperature.

The method may further include comparing the strain spike to other spikes in the strain measurements to ensure the strain spike corresponds with the rail transitioning from tension to compression or compression to tension.

The method may further include wherein the other spikes include strain spikes experienced from a passing railcar.

The method may further include wherein the comparison looks to the amplitude and duration of the spike.

The method may further include wherein the strain spike is experienced only when the rail transitions from compression to tension.

The method may further include calculating neutral temperature of the rail based on the neutral temperature spike.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1:
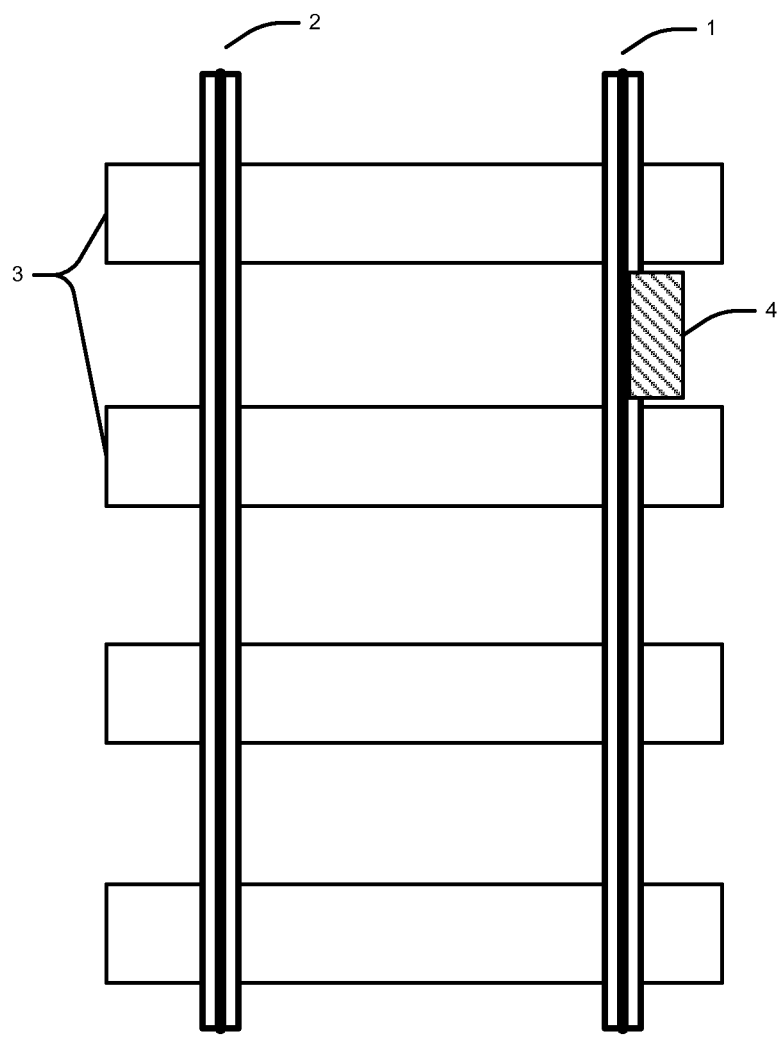
FIG. 1 is a diagram of a portion of railway and a field sensor system.

The present disclosure may be understood by reference to the following detailed description, taken in conjunction with the drawings as described below. It is noted that, for purposes of illustrative clarity, certain elements in various drawings may not be drawn to scale.

This application relates to a variety of inventions as disclosed herein, and should be read and interpreted with the understanding that various inventions are disclosed herein by describing, illustrating, or otherwise disclosing specific implementations of those inventions. Thus, any features, procedures, methods, systems, brief descriptions of the drawings, or other aspects described or illustrated herein are not intended to limit the scope of any claimed invention in a manner not specifically required by the issued claims of this patent.

In addition, the following disclosure should be read and interpreted as providing an adequate disclosure and written description for any single feature, procedure, method, system or other aspect of any of the disclosed subject matter, whether or not such single feature, procedure, method, system or other aspect has been described as being implemented separately. Similarly, the following disclosure should be read and interpreted as providing an adequate disclosure and written description for any partial implementation of the methods, systems, and/or apparatuses disclosed herein, whether or not such partial implementations have been specifically described or illustrated. None of the features, procedures, methods, systems, or other aspects of these specific implementations are an essential or required aspect or element of any claimed invention unless explicitly required by the claim directed to that invention. For example, although this disclosure outlines techniques for data logging, collection, and analysis, it should be understood that data logging, collection, and analysis are not all required aspects of any claimed invention unless explicitly required by the claim directed that invention.

Further, the following disclosure should be read and interpreted with the understanding that any feature, procedure, method, system, aspect, invention, or combination thereof that is described and/or illustrated in this disclosure may be combined with any other feature, procedure, method, system, or other aspect described and/or illustrated in this disclosure, even if such a combination is not shown or specifically described. This disclosure should be interpreted as providing an adequate disclosure and written description of any such combinations.

Various structures in our society are relied upon to maintain their integrity, shape, and useful function. Once constructed, however, these structures can be degraded by time, the elements and other factors. If severely degraded, undesirable and even catastrophic effects can result.

For example, one crucial structure that is subject to eventual detrimental changes and loss of integrity is the rail used to construct the railroads on which trains operate. Over time, weather conditions, railroad track maintenance, changes in the track sub-structure or even normal train operations can have an effect and degrade the structural integrity of railway rail to unsafe levels. In some situations, however, it is possible to monitor various characteristics of the rail, and determine whether the structural integrity of the rail is poor. Further, if monitored properly, it is possible in some situations to detect if conditions are such that a problem is likely to occur. If detected early enough, measures can be taken to avert problems.

FIG. 1 is a diagram of a portion of railway with rails 1 and 2 and ties 3. Mounted on rail 1 is a track or field sensor system 4, which can be used to monitor various characteristics and conditions of the rail. The field sensor system 4 is made up of various field sensor system components, which may include electronics, sensors, and other components to facilitate the measurement of various conditions of the rail 1. The field sensor system 4 collects data from the structure to be monitored, which in FIG. 1 is the rail 1. Data relating to the condition of the rail 1 is collected either continuously or periodically, and in some embodiments, the field sensor system 4 stores this data in a storage device or memory located within the field sensor system 4.

Figure 2A:
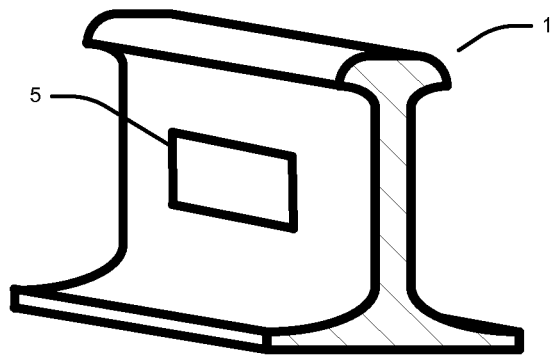
FIGS. 2a and 2b are cross sectional diagrams of both sides of a rail.
Figure 2B:
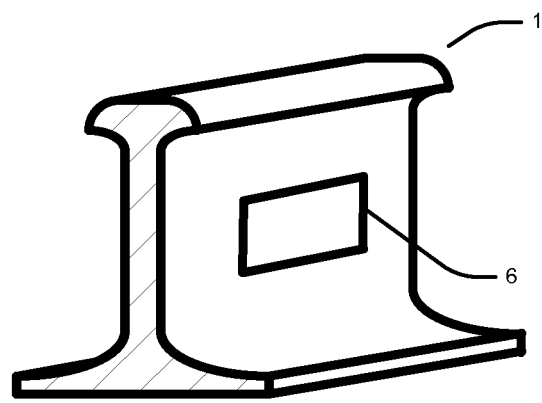

FIG. 2a and FIG. 2b show a cross sectional diagram of both sides of rail 1 in FIG. 1. As shown in FIG. 2a, which illustrates the outboard or outward side of the rail 1, various components 5 of the field sensor system 4 may be mounted along the web of the rail 1. FIG. 2b illustrates the inboard or inward side of the rail 1 where various components 6 of the field sensor system 4 are mounted along the web of the inner portion of the rail 1. Depending on the specific information or characteristics to be determined about the rail 1, the field sensor system 4 may include components 5, or components 6, or both. The components 5 or 6 may be housed in an enclosure that is mounted along the web of the rail 1.

In other embodiments, additional components of the field sensor system 4 may additionally be mounted along one or both sides of the opposing rail 2. Further, depending on the information required from the rails 1 and 2, it may also be appropriate to alternatively or additionally place components at other locations along the rail (other than along the web).

Figure 3:
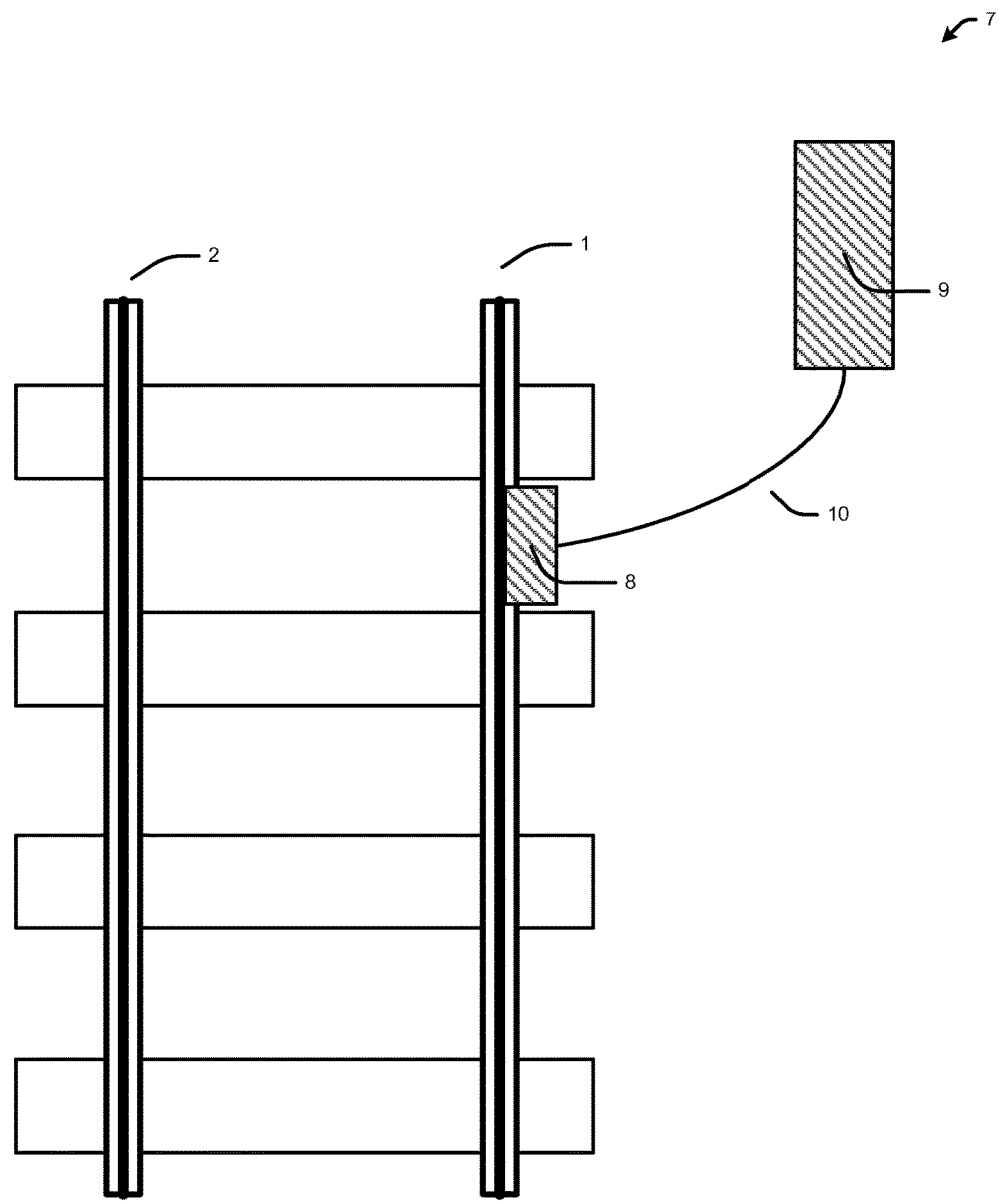
FIG. 3 is a diagram of a portion of a railway and an alternate field sensor system.

FIG. 3 shows an alternate configuration. In some situations, it may be preferable for some of the field sensor system components to be mounted a distance away from the rails 1 and 2, for a variety of reasons, including convenience, reliability, and to ensure that there is sufficient room for all of the components of the field sensor system. In FIG. 3, the field sensor system 7 is represented by boxes 8 and 9. Some of the components of the field sensor system are represented by box 8, which is located on or near the rail 1, and others are represented by box 9, which is located a distance away from the rail 1 (e.g., 30 feet). Often, components of the field sensor system 7 represented by boxes 8 and 9 are able to communicate over communications connection 10, which may be a wireless or wireline (cabled) connection.

Figure 4:
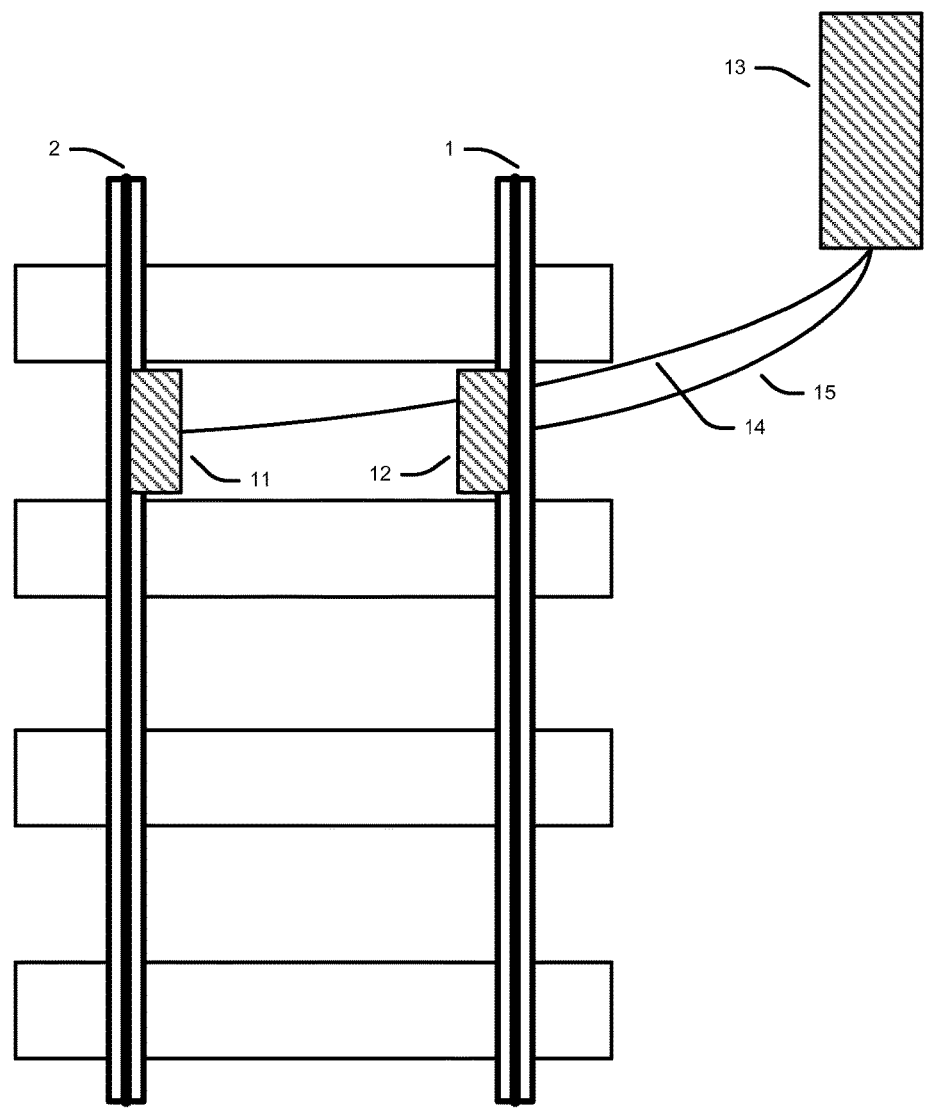
FIG. 4 is a diagram of a portion of a railway and an another alternate field sensor system.

In another embodiment, shown in FIG. 4, the field sensor system is represented by boxes 11, 12, and 13. In this embodiment, some of the components are located along the rails (see 11 and 12), and some components are located a distance away from the track, as represented by box 13. Normally, various components of the field sensor system in an embodiment such as that shown in FIG. 4 are connected in some fashion (see connections 14 and 15).

Figure 5:
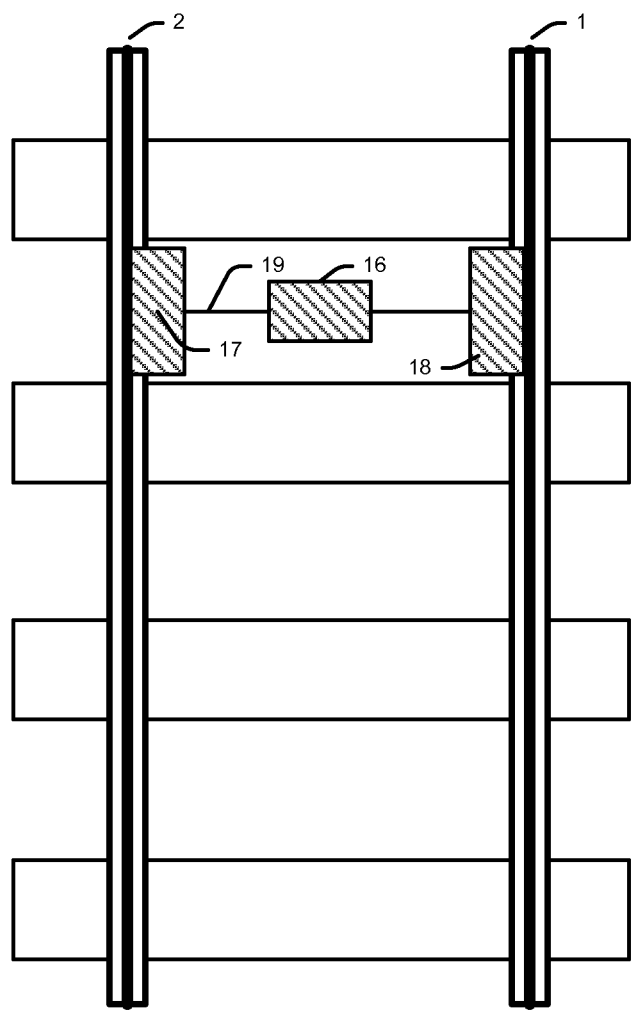
FIG. 5 is a diagram of a portion of a railway and a crib-based field sensor system.

FIG. 5 shows yet another configuration of the field sensor system, in which some of the field sensor components are located in a crib 16 between the rails 1 and 2. The field sensor system comprises, in this embodiment, the crib 16, and components at the rails 1 and 2, as represented by the boxes 17 and 18, all of which are connected by connection 19.

Figure 6:
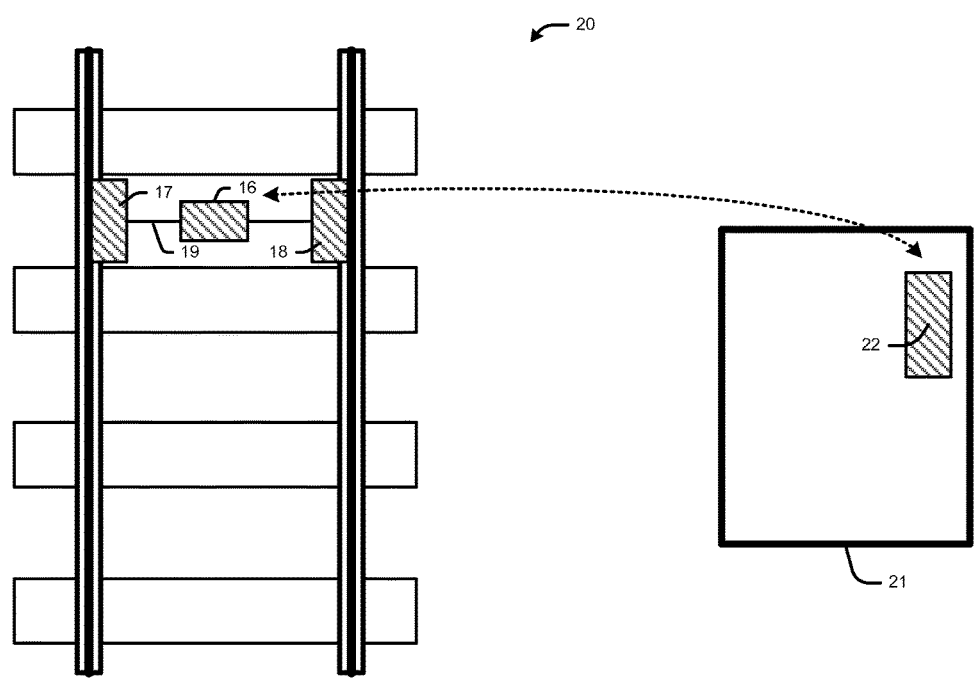
FIG. 6 is a diagram of a field sensor system where data collection is taking place.

In FIG. 6, the field sensor system 20 is made up of crib 16, components represented by boxes 17 and 18 (mounted along the rails 1 and 2), and connection 19. Data is collected from the rails 1 and 2 periodically by the components 17 and 18, and the data is stored in a storage area located in crib 16. In the embodiment of FIG. 6, the data stored in structure 16 is collected by data collection personnel. Data collection personnel travel (often using a vehicle 21) to the portion of the track where the field sensor system 20 is located, and use a data collection device 22 to collect the data from the field sensor system 20. Collection of the data takes place by interfacing the data collection device 22 to the field sensor system 20. This interface may be created in a variety of ways, such as through a physical RS-232 connection between the field sensor system 20 (or crib 16) and the data collection device 22, through a USB connection, or through any other means now known or hereafter developed for physically connecting two devices for the purpose of data communication.

In another embodiment, however, the data collection device 22 is able to interface with the field sensor system 20 over a wireless interface, such as Bluetooth, WiFi, or any other popular, proprietary, or otherwise appropriate method now known or hereafter developed. In such an embodiment, the data collection device 22 could query the field sensor system 20 for the data it has collected, and some or all of the data can then be transferred to the data collection device 22. In some situations, a wireless interface allows the person collecting the data to avoid leaving his or her vehicle 21 to collect the data. Some of the possible wireless technologies currently available are described in Shier, "Wireless Options for the Pocket PC: A Tutorial," Pocket PC Magazine, September 2003, p. 79, which is hereby incorporated by reference.

Figure 7:
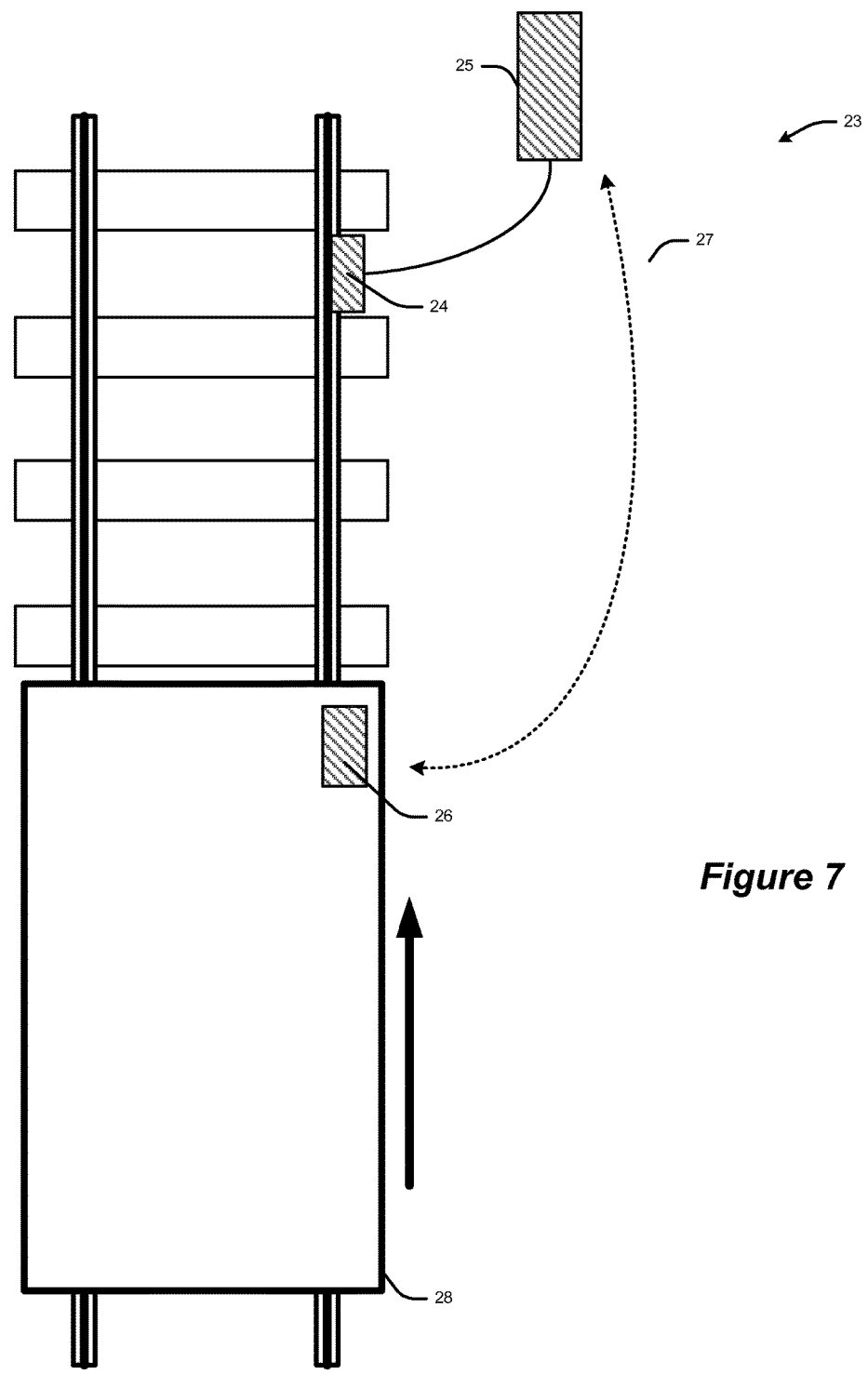
FIG. 7 is a diagram of a field sensor system where data collection is taking place in an alternate manner.

In FIG. 7, a field sensor system 23 is comprised of components 24 and 25, and it communicates with a data collection device 26 over a wireless interface 27 in a manner similar to that described in connection with FIG. 6. In the embodiment of FIG. 7, however, the data collection device 26 is located on a railway vehicle 28. The data stored in the field sensor system 23 is collected by the device 26 when the railway vehicle 28 comes close to the field sensor system 23, such as when it passes that portion of the track where the field sensor system 23 is located.

Normally, there are multiple field sensor systems located at various locations on the railway. Therefore, the data collection device 26 in the embodiment of FIG. 7 is preferably configured to allow collection of data from a variety of field sensor systems 23 located along the railway. Data is collected from each field sensor system as the railway vehicle 28 travels along the track. The railway vehicle 28 in FIG. 7 could be a railroad car or other vehicle that is adapted for use on the railway. Preferably, the railway vehicle 28 is a railroad car or other vehicle that regularly travels on the track for other purposes, so as to reduce the necessity of independent data collection personnel physically visiting each field sensor system solely to collect data from the field sensor system 23.

Figure 8:
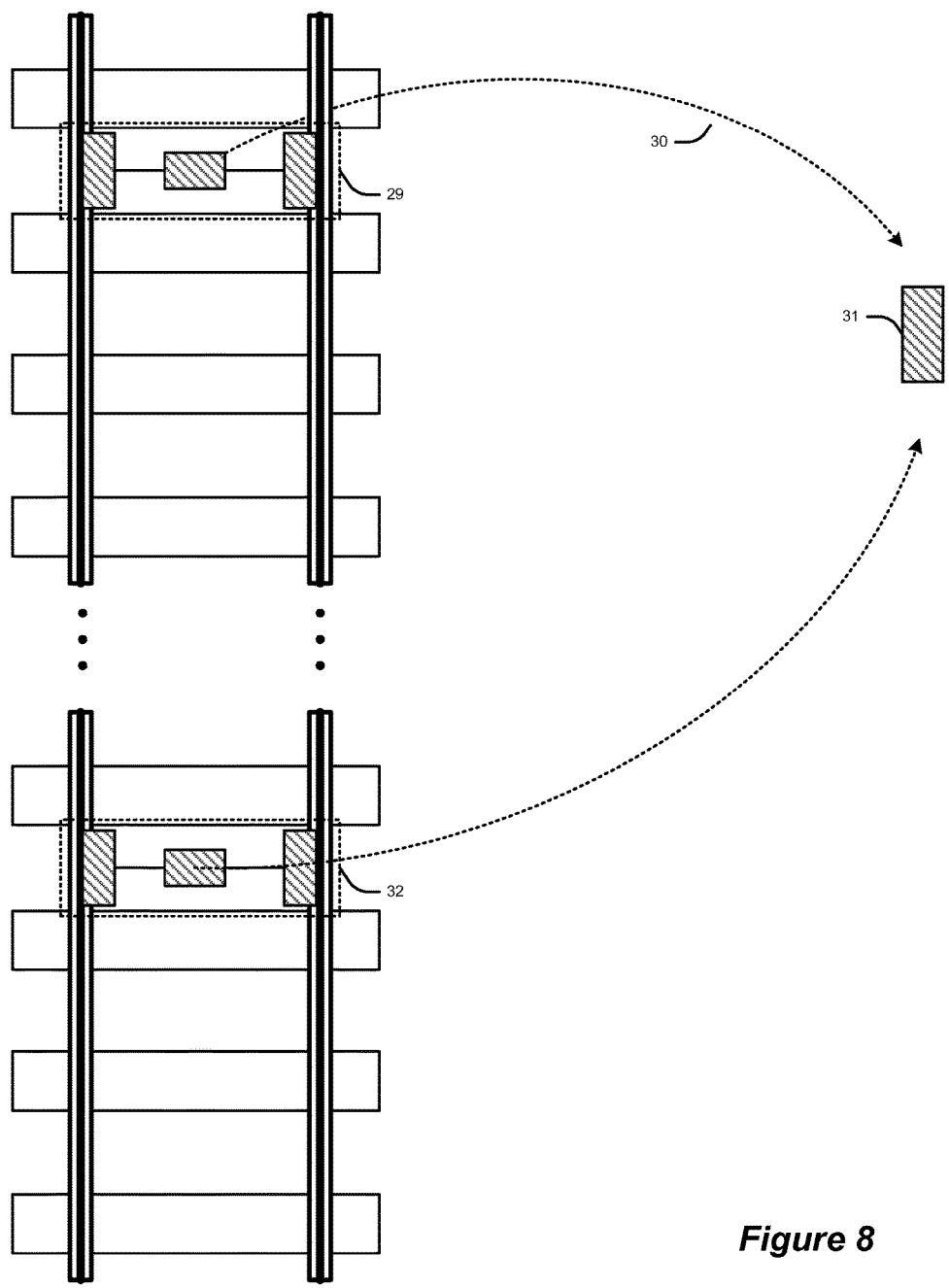
FIG. 8 is a diagram of a field sensor system where data collection is taking place in yet another manner.

In the embodiment of FIG. 8, a field sensor system 29 is configured in a crib configuration, such as in FIG. 6. (It should be understood that other configurations for the field sensor system 29 could be used, such as one or more of the configurations previously described.) The field sensor system 29 in the embodiment of FIG. 8 includes the capability to initiate communication over a wireless interface 30 to a data collection device 31. The field sensor system 29 in such an embodiment may initiate communication with the data collection device 31 periodically, and each time transfer the data it has collected to the data collection device 31. Alternatively, the field sensor system 29 may initiate communication with the data collection device 31 only when one or more of a particular set of conditions arise, such as conditions that suggest a degradation of the structural integrity of the rail being monitored.

The ability for such communication initiated by the field sensor system 29 can be implemented by including within the field sensor system 29 cell or mobile telephony capability, satellite capability, WiFi, or any other known or hereafter developed technique for wireless communication. The data collection device 31 in such an embodiment may be at a distant location, and may also be in a location that allows more than one field sensor system to communicate with it, so that, for example, the data collection device 31 can receive data from field sensor systems 29 and 32, which monitor different portions of track. See FIG. 8.

Figure 9:
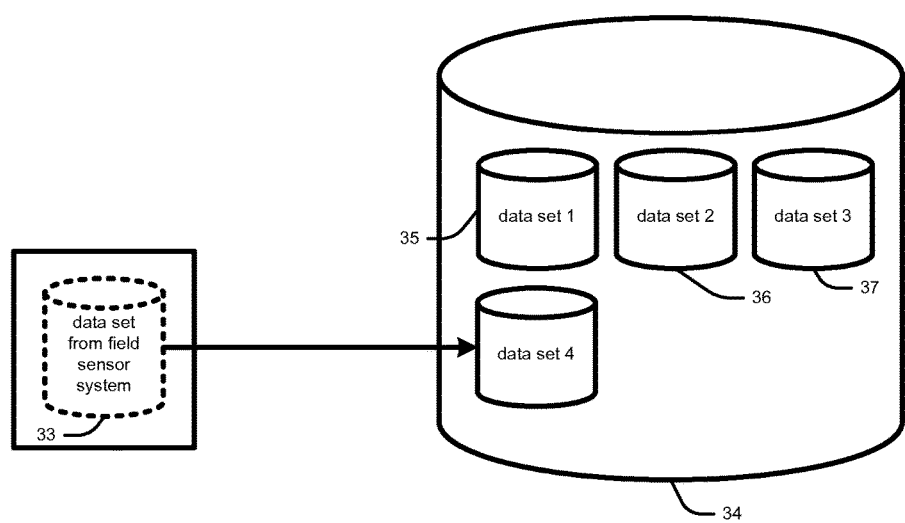
FIG. 9 is a diagram of data being stored in a database.

Once data is collected by a data collection device, the data may then be integrated into a master database that includes data relating to the structure being monitored (e.g., a railway rail) from prior data collection efforts. In FIG. 8, data from field sensor system 29 in one reading is collected by data collection device 31, and is represented by the data set 33 shown in FIG. 9. As shown in the embodiment of FIG. 9, the data set 33 from such a collection effort is integrated into a master database 34 along with data sets 35, 36, and 37 from prior collection efforts. The data in the database 34 can then be processed and/or analyzed to determine various characteristics and information about the condition of the structure(s) being monitored. The data in database 34 can be studied and analyzed to identify any situations where the integrity of the structure(s) being monitored has or is being degraded. In some situations, data from a history of collection efforts can be studied to determine patterns or trends in how the structure being monitored changes over time, or in response to various weather conditions, stresses, or other conditions.

Figure 10:
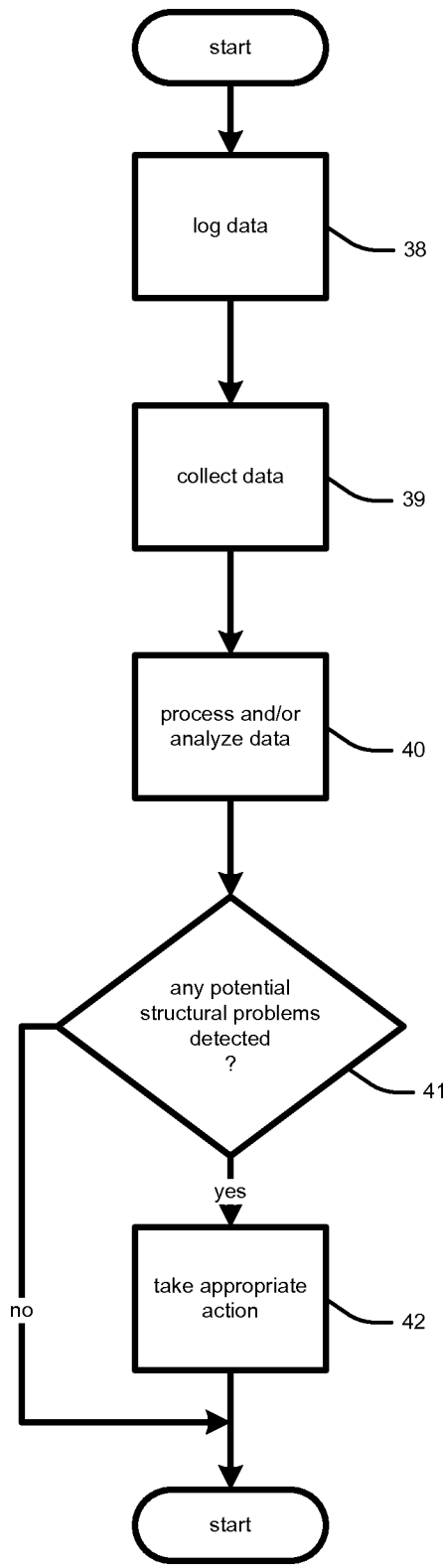
FIG. 10 is a flow chart illustrating the operation of data logging, collection, and analysis in some embodiments of the present invention.

FIG. 10 is a flow chart summarizing a typical process for data logging, collection, and analysis in an attempt to monitor and detect specific conditions that indicate a structure, such as a railway rail, may degrade to a point where it is no longer safe. Once the data is logged 38 and collected 39 in the manner previously described, the data can then be processed and analyzed 40, perhaps by comparing data from different data collection efforts, or by evaluating data to detect specific structural integrity issues. If any potential structural problems are detected 41, appropriate actions can be taken 42 to avert any safety hazards, and to repair or replace the affected structure. This process can be repeated indefinitely.

One particularly difficult structural problem associated with railway rail is its tendency to expand and contract over time. Specifically, railway rail is subject to expansion and contraction that is proportional to the temperature of the rail. When rail is heated, such as through weather changes or normal use, it expands, creating a compressive force. When rail is cooled, it contracts, thereby creating a tensile force.

At one time, railway track was constructed of relatively short individual track rails that were fastened together end-to-end using rail joints. Adjacent rails were typically spaced apart at each end with a small gap, which accommodated changes in the rail length. Presently, however, most railroads are constructed of continuously welded rail, so that the gaps between adjacent rails are virtually eliminated. With continuously welded rail, the rail's tendency to change length with changing temperatures is, in a sense, magnified, since there are no natural expansion or contraction joints to allow the rail to expand or contract.

The rail's tendency to change length represents a significant safety problem, because if the internal compressive forces on the rail become too great, the rail can buckle or kink (sun kinks). If the tensile forces become too great, the rail can crack and pull apart. Either condition jeopardizes the safety of normal train operations, and in some situations can lead to catastrophic train derailments. Unfortunately, it is often not visually apparent whether a particular rail is under an axial load that is potentially unsafe, so a safety hazard caused by a kinked rail, for example, may arise without much warning.

One way to address structural problems relating to the expansion and contraction of railway rail is to monitor the neutral temperature of the rail, which is defined as the temperature at which the rail is neither in tension or compression. When a rail is at its neutral temperature, it has no tendency to change length and has no internal axial force or stress. At temperatures which are cooler than the rail's neutral temperature, the rail is stretched and has an internal tensile force. And at temperatures warmer than the neutral temperature, the rail is squeezed and has an internal compressive force.

When new rail is laid by the railroads, it is installed at a safe neutral temperature predetermined by the railroad (90.degree. F., for example). Yet it has been discovered that during normal railroad operation, the neutral temperature does not stay the same over time, but rather, can drift higher or lower. This neutral temperature drift can be caused by track maintenance, changes in the track sub-structure, normal train operations, or other conditions. It is not uncommon for a railroad to discover that the neutral temperature of a section of track has drifted down to 60.degree. F. or even 50.degree. F. If the neutral temperature of the rail is 60.degree. F., then the rail is under a compressive force at any time weather or other conditions raises the actual temperature of the rail above 60.degree. F. And in some situations, if the temperature of the rail exceeds the neutral temperature by more than approximately 50.degree. F., the compressive force can be great enough to cause the rail to buckle or kink.

By monitoring the neutral temperature of the rail, it is therefore possible to identify rails that are susceptible to failure (cracking or kinking) due to excessive internal compressive or tensile forces. And through consistent monitoring of the neutral temperature of a rail, the railroads can be given an early warning about potentially hazardous rail conditions, and appropriate corrective actions or repairs can be undertaken before unsafe conditions result.

Figure 11:
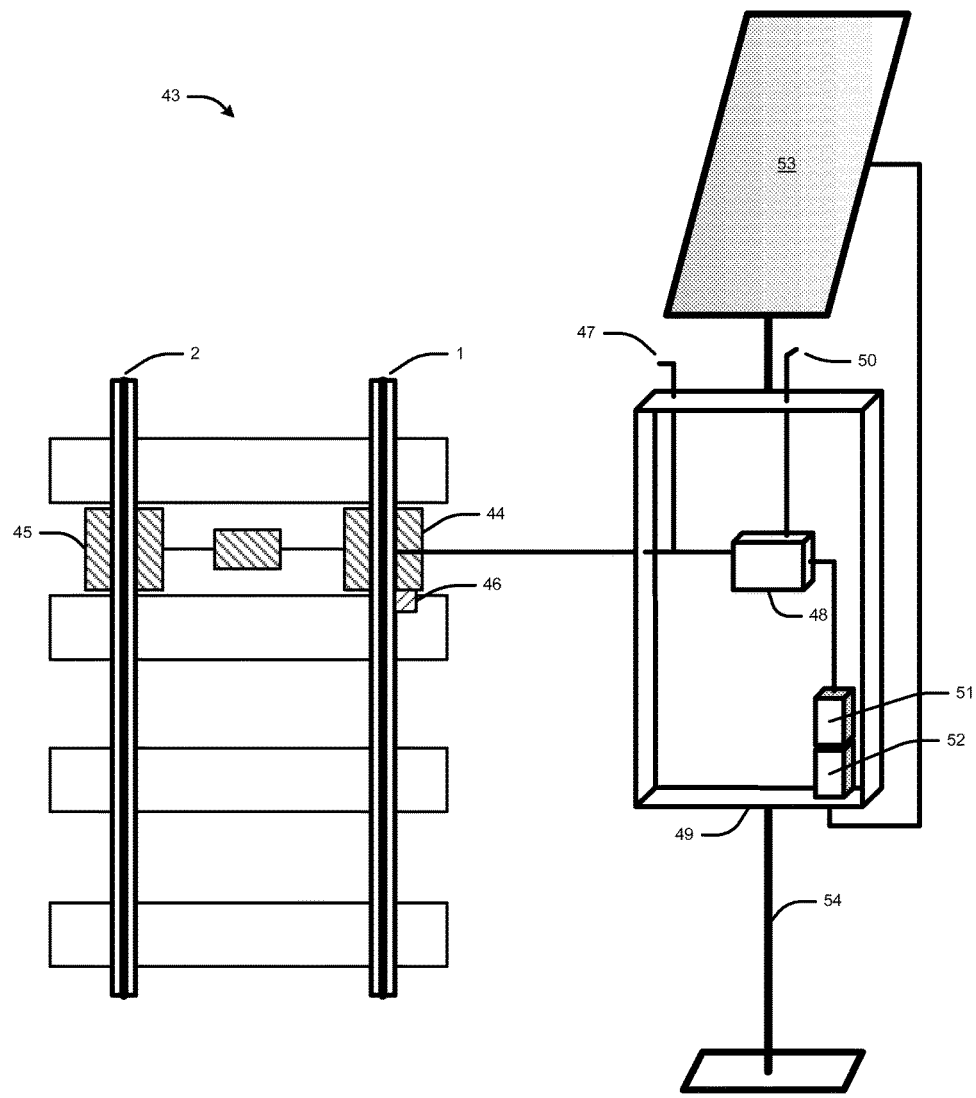
FIG. 11 is a diagram of a field sensor system that can be used to monitor neutral temperature.

FIG. 11 shows a diagram of a field sensor system 43 that can be used to monitor the neutral temperature of rails 1 and 2. The field sensor system 43 includes commercially-available strain gauge circuits, mounted on both sides of each rail at the locations designated by boxes 44 and 45. Two commercially-available thermocouple sensor circuits 46 and 47 are also used, one thermocouple 46 mounted to the rail 1, and the other thermocouple 47 mounted in a location that permits the collection of ambient temperature data. The output of the components 44, 45, 46, and 47 are connected to a module 48 in an enclosure 49. The enclosure 49 houses various components of the field sensor system 43, including the module 48, an antenna 50 that is used for communicating with a data collection device (not shown), rechargeable batteries 51, and a charge controller 52.

Rechargeable batteries 51, such as 12 V DC batteries, power the entire field sensor system 43. The batteries are recharged using a charge controller 52 and a solar panel 53, which is mounted on a pole 54. In some embodiments, it is convenient to mount the enclosure 49 on the solar panel pole 54.

Figure 12A:
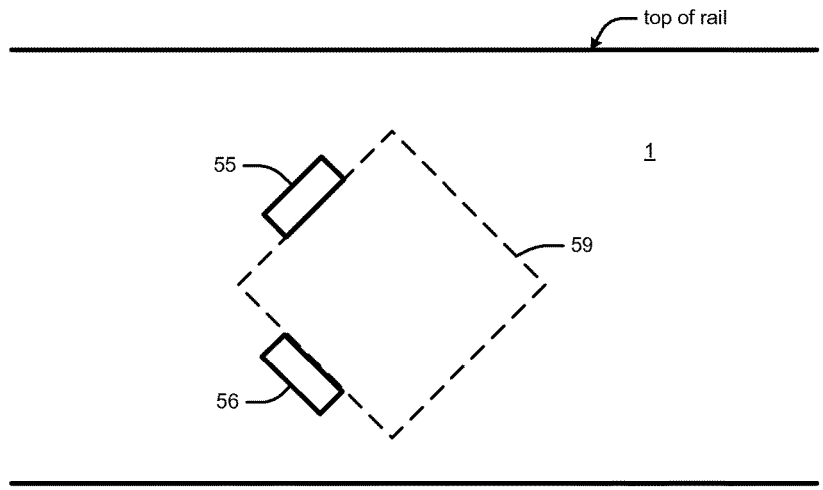
FIGS. 12a and 12b show the configuration of strain gauge circuits on a rail.
Figure 12B:
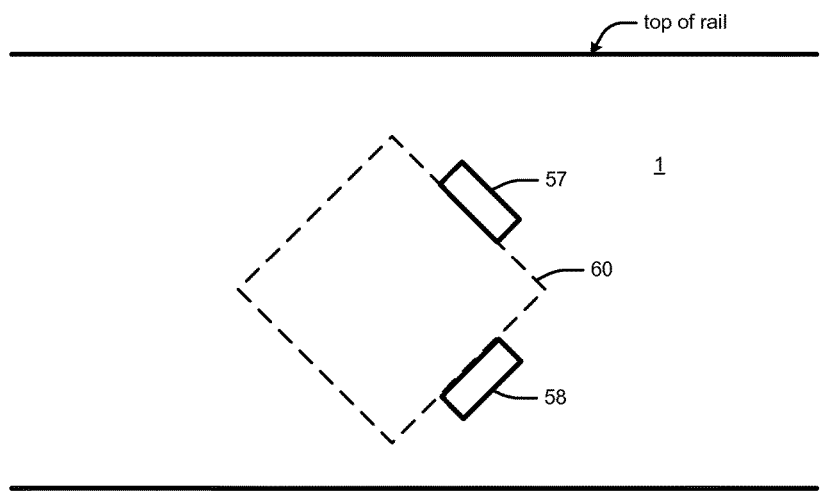

FIGS. 12(*a*) and 12(*b*) show in more detail the configuration of the strain gauge circuit 44 on rail 1. Normally, strain gauge circuits are implemented by resistors that change resistance as they are stretched or compressed. When mounted in the web of the rail, such as is shown in FIGS. 2(*a*) and 2(*b*) and FIGS. 12(*a*) and 12(*b*), they can be used to determine to what extent the rail has been stretched or compressed in the longitudinal direction.

In the embodiment shown in FIG. 12, four separate strain gages 55, 56, 57, and 58, mounted along the web of the rail 1, are used to measure the force in the rail. FIG. 12(*a*) shows the strain gauges 55 and 56 mounted in the web on the outboard side of the rail 1. The gauges are preferably mounted in a Wheatstone bridge configuration, along the side of an imaginary diamond 59 drawn on the web of the rail 1 as shown in FIG. 12(*a*). The gauges 57 and 58 are preferably mounted on the opposite side of the rail (inboard) along a corresponding diamond 60 as shown in FIG. 12(*b*).

Figure 13:
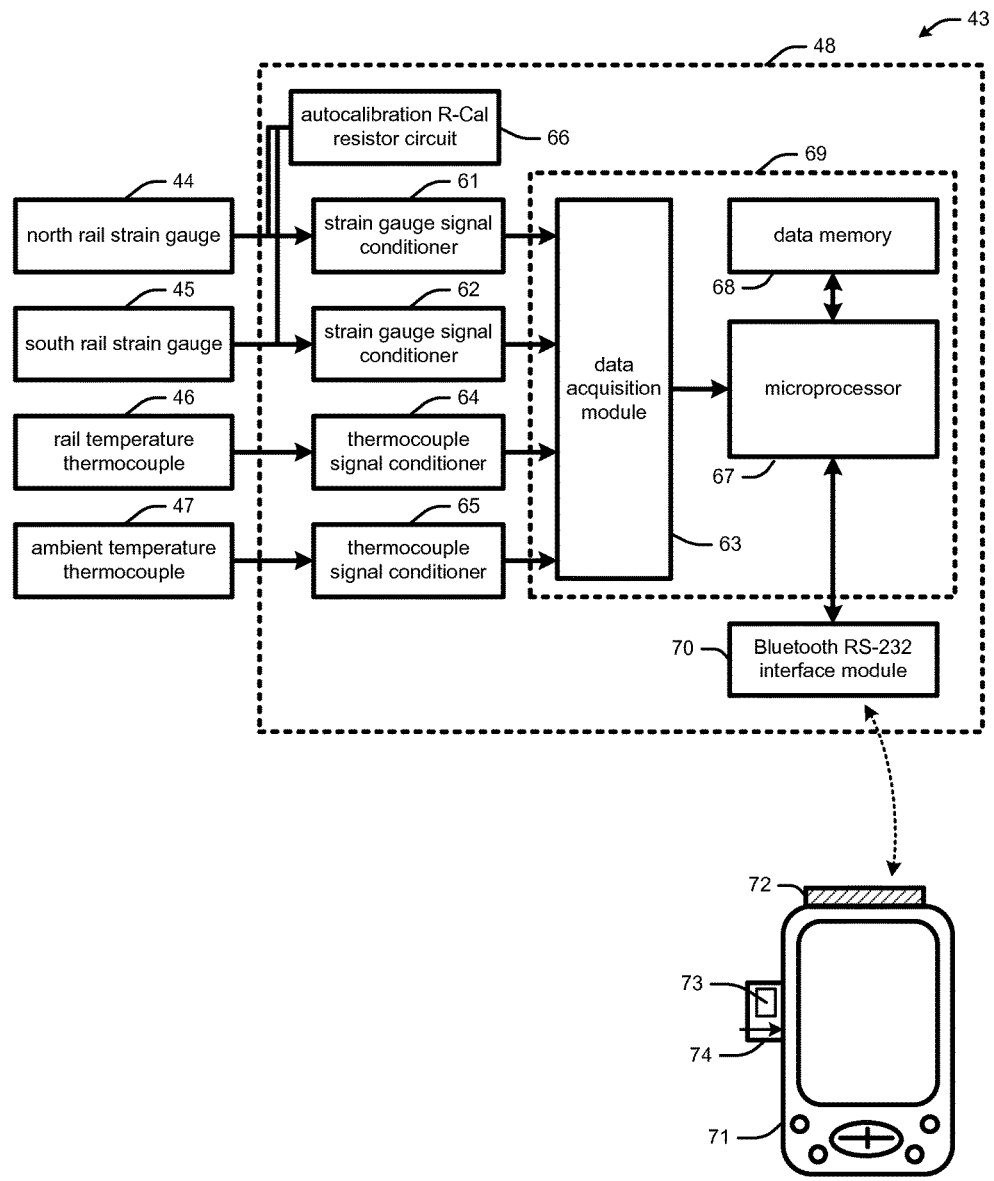
FIG. 13 is a block diagram of a field sensor system.

FIG. 13 is a block diagram of components of the field sensor system 43 shown in FIG. 11 and FIGS. 12(*a*) and 12(*b*). The voltages from the north and south strain gauges 44 and 45 are each fed into a bridge amplification circuit or signal conditioner 61 and 62 to condition the signal before the data acquisition device 63 can read the voltages. The bridge amplification circuits 61 and 62 amplify the voltages that come from the strain gauge circuits 44 and 45. The bridge amplifiers 61 and 62 also provide current for the strain gage circuits 44 and 45. The strain gauges are preferably calibrated when installed, and such calibration may require the current neutral temperature of the rail, which then is used to determine an offset voltage (V.sub.o) that is used in calculating neutral temperature. Calibration may not be necessary for some embodiments, such as for monitoring fluctuations in the neutral temperature.

If calibration is required, any appropriate method now known or hereafter developed for placing a rail at a known neutral temperature or measuring the neutral temperature of an existing rail can be used for calibration. Normally, the rail is simply placed at a known neutral temperature by cutting and re-welding it so that it is not in compression or tension. The current rail temperature is then the neutral temperature of the rail that can be used for calibration. If necessary, there are also ways to measure the neutral temperature of an existing rail, however. For example, one method involves cutting the rail to determine the distance it expands or contracts, and then from this information, calculating its initial neutral temperature. In another method, a portion of existing rail is unclipped from its ties, and the rail is raised several inches. A Verse is used to determine the amount of force is required to raise the rail a certain distance. From this information, the neutral temperature can be determined.

The signals from thermocouples 46 and 47 are fed into thermocouple signal conditioners 64 and 65 that amplify the thermocouple voltages so they can be read by the data acquisition device 63. The signal conditioners 64 and 65 also will preferably contain a cold junction compensator that adjusts for the cold junction created when connecting the thermocouple wire to the signal conditioner. In general, no calibration is necessary for the thermocouple signal conditioners.

In some embodiments, to provide some assurance that data quality is high, an auto calibration R-Cal resistor circuit 66 is used. As is known by those skilled in the art, the R-Cal resistor is used to ensure that the resistance measured by the strain gauges shown in FIGS. 12(*a*) and 12(*b*) is consistent with calibration. The R-Cal resistor can be installed so that it can temporarily replace the resistance provided by the strain gauges (e.g., 55 and 56). By reading the resistance provided by the R-Cal resistor (a known quantity) it can be determined whether the resistance provided by the strain gauges (e.g., 55 and 56) is accurate. This measurement may be taken periodically (e.g., each strain gauge reading or perhaps once per day) or on demand to ensure data quality.

A microprocessor 67 and memory 68 are used for storing data from the data acquisition module 63. The data acquisition module 63, the microprocessor 67, and the data memory 68 may, in some embodiments, be implemented using a commercially-available data logger device 69, such as an Adam-5510 manufactured by Advantech of Cincinnati, Ohio. In other embodiments, the data logger device 69 could be integrated as one or more components, perhaps on a single circuit board.

Also shown in FIG. 13, a Bluetooth wireless interface module 70 is controlled by the microprocessor 67 to communicate with a PDA or Pocket PC or other portable device 71, which has a Bluetooth communications module 72 and is executing an application program 73. An insertable storage card 74, such as a Secure Digital card, may also be used as storage for the application program 73.

In some embodiments, the components used to construct the field sensor system 43 are chosen or designed so that they facilitate replacement or repair of the system 43. For example, the module 48 might be designed so that it can be easily replaced in the event that one or more components of the module 48 fails. In such an embodiment, a field sensor system having a faulty module 48 may be remedied by disconnecting the sensors, power, and antenna cables from the faulty module 48, and replacing it with a substitute module having the same or similar connections, so that the same sensors, power, and antenna cables can be easily reattached. The faulty module 48 may then be sent to an appropriate location for diagnostic testing, if desired.

By designing the system 43 to allow for these types of "modularized" replacements of the module 48 (or other components in a similar fashion), repairs can be completed more efficiently. In some situations, a technician with little familiarity with the system 43 can effectively repair it by replacing one or more of the modular components that are part of the system 43.

Using the strain gauges 44 and 45 and the thermocouples 46 and 47, the neutral temperature of each rail can be calculated from the rail temperature and the internal force in the rail. Specifically, NT=T−P/(Area.times.E.times.a)

Where: NT is the neutral temperature of the rail, T is the actual temperature of the rail, P is the internal longitudinal force in the rail, Area is the area of the rail cross-section, E is the Modulus of Elasticity for the track system, a is the Coefficient of Thermal Expansion for steel.

The temperature of the rail, T, is calculated from the thermocouple devices mounted on the rails as follows: T=(V.times.A)−B Where: T is the temperature of the rail (Fahrenheit), V is the voltage from the signal conditioners, A is the temperature conversion scale constant, B is the temperature conversion offset constant.

And the force in the rail, P, is calculated using the strain gauge circuits mounted on the rails, as follows: $P=(V_s+V_o) \times C$ Where: P is the force (lbs.) $V_s$ is the strain gauge voltage, $V_o$ is the voltage offset in volts (from calibration), C is the voltage to force conversion constant.

Background and additional information relating to the foregoing calculations can be found in Beer & Johnston, Mechanics of Materials (McGraw Hill 1981), Cook & Young, Advanced Mechanics of Materials (MacMillan 1985), and Omega Engineering, Inc., The Temperature Handbook (Omega 1999). Each of these references is hereby incorporated by reference.

Referring to FIGS. 11 and 13, the sensors 44, 45, 46, and 47 are sampled periodically at a defined interval, such as once each hour, although this time period can be configured as desired. The data acquisition device 63 converts the analog voltages to digital voltages for each of the four sensor readings. Software in the microprocessor 67 stores these voltages in the memory 68 along with a time stamp of when they were collected. The sensor readings are stored in the field sensor's memory 68 until they can be downloaded to a data collection device 71. Each time a sample or reading is taken (e.g., each hour), a reading counter maintained in the memory 68 is incremented so that the number of samples that are stored in the memory 68 can be ascertained.

Data is collected from the memory 68 using a handheld device, such as a Pocket PC device 71 with wireless communication capability. The Pocket PC device 71 executes a data collection application (represented by 73 in FIG. 13) that enables wireless communication with the field sensor system 43. In the embodiment of FIG. 13, data is transmitted to Pocket PC 71 over a wireless signal using the Bluetooth wireless communications protocol. The module 48 includes a Bluetooth RS-232 module 70 that is attached to the RS-232 port of the microprocessor 67, and the Pocket PC 71 includes a Bluetooth radio module 72. The RS-232 module 70 and the module 72 in the Pocket PC allow wireless communication as if an RS-232 cable linked the Pocket PC 71 and the microprocessor 67.

In the embodiment of FIG. 13, when the data collection application 73 is executing on a Pocket PC 71, and a user brings the Pocket PC 71 within the range (approximately 10 meters) of the Bluetooth RS-232 Module 70, the Pocket PC 71 automatically connects to the field sensor system 43 (module 70) and establishes a connection. In some embodiments, the system parameters for the field sensor system 43 as well as all of the data that has been collected in memory 68 since the last download are automatically downloaded to the Pocket PC 71 upon establishing an initial communications link. This data is stored in available storage in the Pocket PC 71.

In some embodiments, it is useful to store the system parameters for the field sensor system 43 in the memory 68. Storing system parameters for the field sensor system 43 in the memory 68, and making such system parameters available to be downloaded by any Pocket PC 71 device that may be used for collection of data ensures that data collection personnel can use any Pocket PC running the data collection application 73 to download the data. In other words, multiple Pocket PCs can be used interchangeably in some embodiments to collect data from various field sensor systems.

The system parameters stored in the field sensor system 43 may include: (1) the system date and time as maintained by the field sensor system, (2) field sensor system name, (3) field sensor system identifier (e.g., a number or code), (4) number of records of normal data collected, (5) number of records of archive data collected, (6) strain gauge voltage offsets for each rail, (7) initial neutral temperature for each rail (when the rail was installed or most recent calibration), and (8) rate at which data is sampled.

Once the system parameters and the data collected since the last download have been retrieved by the Pocket PC device 71, the memory 68 may also then be cleared. The Pocket PC 71 can also specify specific data to be retrieved from or written to the field sensor system 43 by sending ASCII commands to the microprocessor 67 over the Bluetooth connection.

Figure 14:
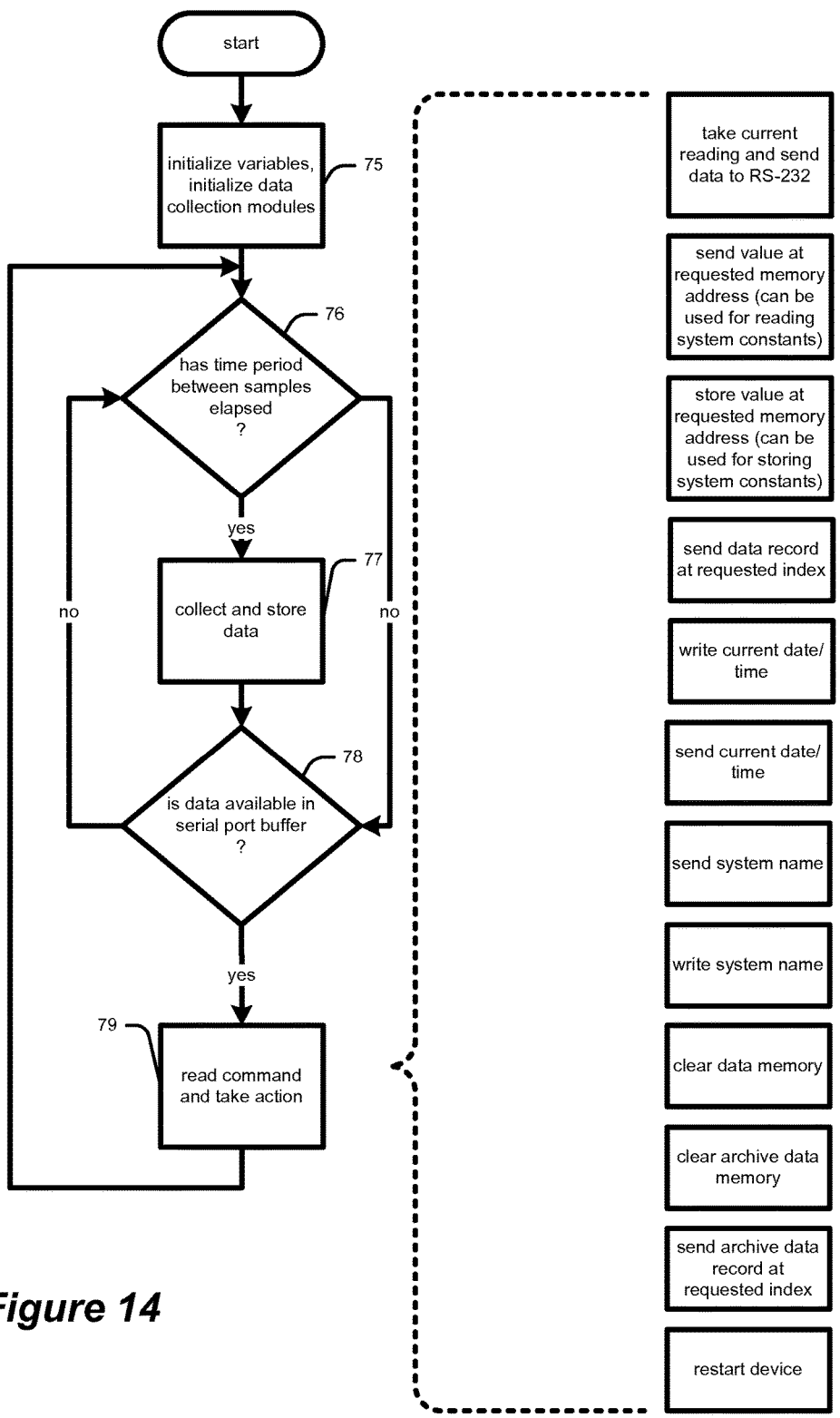
FIG. 14 is a flow chart of the operation of a device in a field sensor system.

FIG. 14 is a flow chart of the operation of data logger device 69 in the embodiment of FIG. 11 and FIG. 13. When the field sensor system 43 is installed, memory and various variables (such as a sample counter) are initialized 75, and the system enters a loop at 76. Once a sufficient amount of time has elapsed, the data from the sensors is collected 77 through the data acquisition device 63 and stored in memory 68 for later collection. Also, the serial port buffer for the microprocessor 67 is continuously monitored 78 for data representing a command sent by a Pocket PC device 71. If such data is present at the serial port, appropriate action is taken in response to the command. The microprocessor is capable of performing a variety of actions, some of which involve reading from and writing to memory 67. See 79 in FIG. 14.

Figure 15:
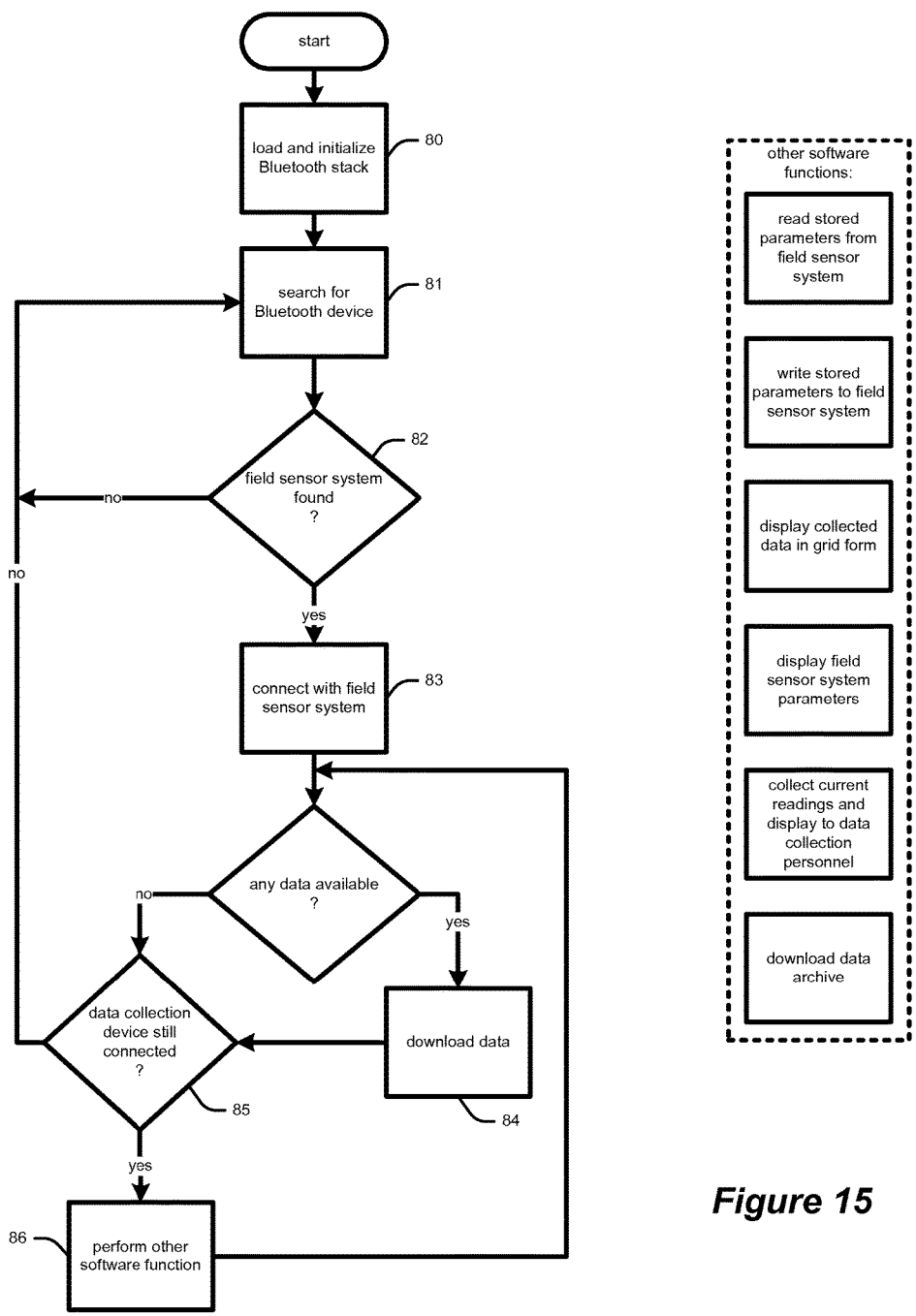
FIG. 15 is a flow chart of the operation of a data collection device.

FIG. 15 is a flow chart of the operation of the data collection application 73 running in the Pocket PC 71 used by data collection personnel in FIG. 13. At startup 80, the Bluetooth capability or other communications capability is loaded and initialized. When data collection personnel starts the data collection application 73, he or she has typically traveled to a location near a field sensor system 43, and the Pocket PC 71 enters a loop searching for another Bluetooth device in the area 81. Once a field sensor system has been detected 82, the Pocket PC 71 connects to it through the Bluetooth connection 83. Upon making this initial connection, the system parameters for the field sensor system 43 and any available data are downloaded 84 to the Pocket PC device.

While the Pocket PC device is still connected 85, a number of other software functions 86 can be performed. For example, once the data stored in the field sensor system memory 67 is downloaded, data collection personnel can view the recently retrieved data or data from previous collection efforts on the Pocket PC 71, and view and change any of the system parameters that are stored at the field sensor system 43.

Figure 16:
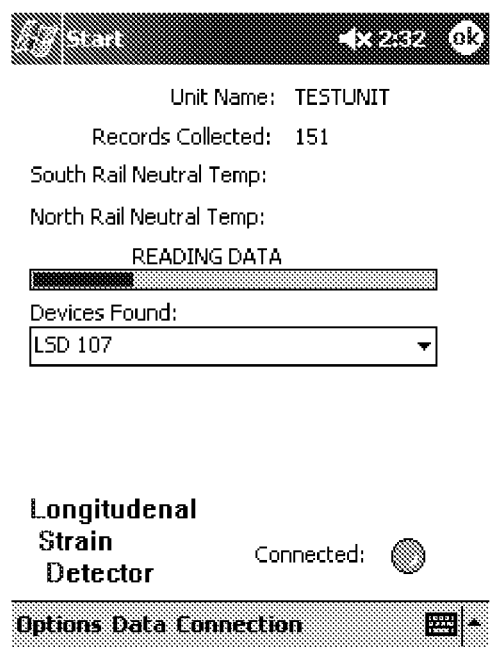
FIGS. 16, 17, 18, 19, and 20 are screen displays for a Pocket PC-based data collection device.
Figure 17:
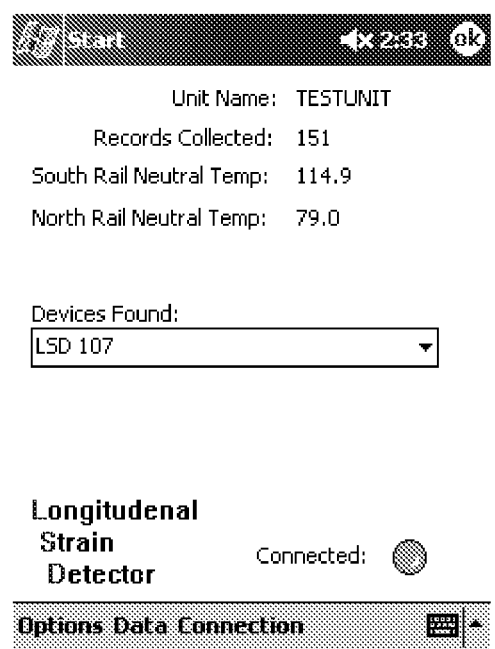

FIG. 16 shows the display of a Pocket PC device 71 in an embodiment such as that illustrated in FIG. 15. In FIG. 16, the display is shown after the Pocket PC 71 has made an initial connection to a field sensor system having the name "LSD 107." FIG. 16 also shows that 151 data records are being read from the LSD 107 field sensor system. Once the data is read, the Pocket PC 71 calculates the neutral temperatures for both the north and south rails, preferably using the most recent data record, and this calculation is displayed, as shown in FIG. 17. (In some embodiments, it is possible that the neutral temperature calculation is performed by the data logger device 69, or by other logic.)

Figure 18:
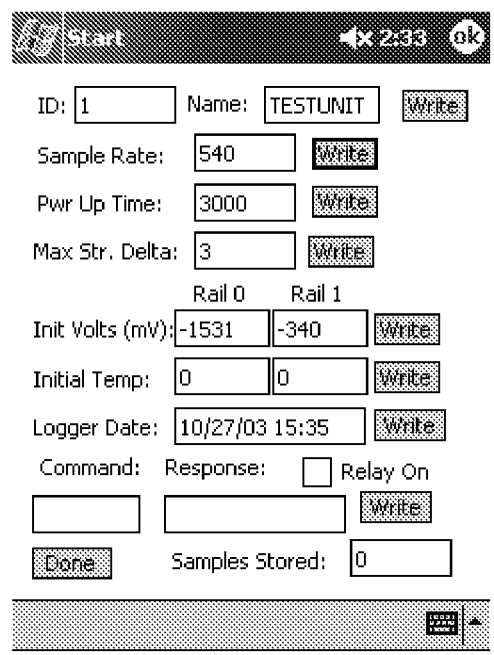

Selecting the "Options" menu at the bottom of the screen in FIG. 16 provides the ability to (1) exit the program, and (2) view the system parameters for the field sensor system. Selecting the option to display system parameters causes a screen such as that shown in FIG. 18 to appear. From this screen, it is possible to change the indicated parameters by changing the displayed item and then selecting the "write" button to write the data to the field sensor system. The data is written by communicating with the microprocessor 67 over the wireless Bluetooth connection.

Figure 19:
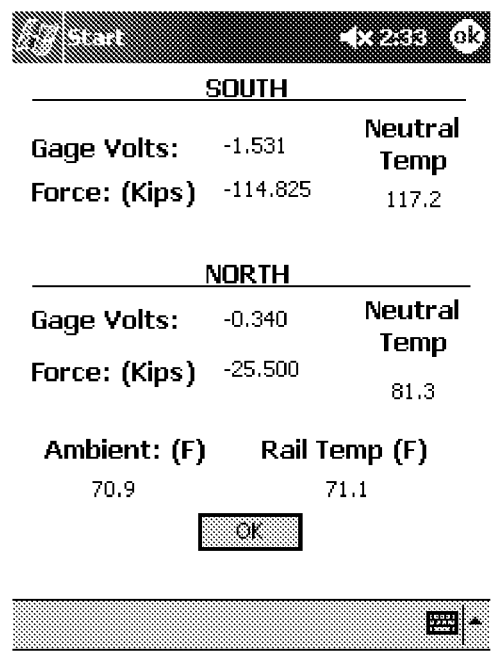

The "Data" menu item in FIGS. 16 and 17 provides the ability to display (1) the current neutral temperature calculation, or (2) historical data retrieved by the Pocket PC device 71. Selecting the first option causes a screen such as that shown in FIG. 19 to be displayed, which shows the neutral temperature calculation in FIG. 17, as well as some of the underlying data used to calculate the neutral temperature.

Figure 20:
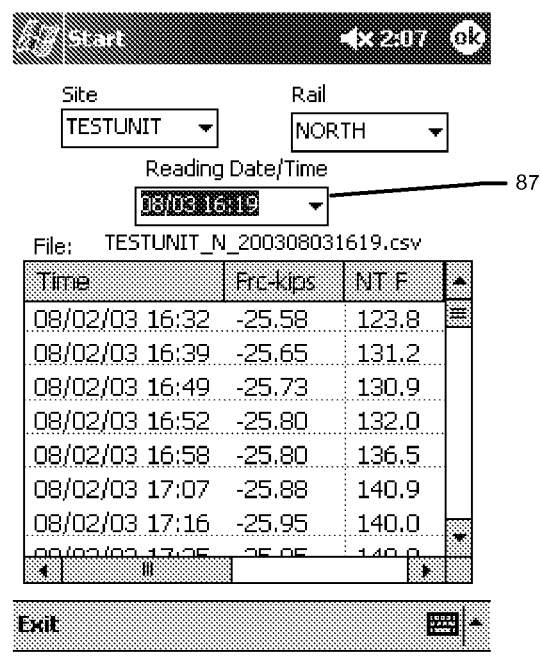

Selecting the second option causes a screen such as that shown in FIG. 20 to be displayed. The screen in FIG. 20 shows the raw data collected by the field sensor system, and the time each reading was taken. The reading date/time 87 shown in the center of the screen is the date the Pocket PC 71 downloaded the data from the field sensor system 43, and the time entries shown in the grid are the actual times the sensor measurements were for the indicated site and rail were taken by the field sensor system 43. Data collection personnel can select other reading dates 87 stored on the Pocket PC 71 by selecting the desired date from the drop-down menu associated with 87 shown in FIG. 20.

In some embodiments, the application running on the Pocket PC 71 is stored on a Secure Digital (or other) memory card 74 that can be inserted and read by the Pocket PC. This allows the software to be used on virtually any Bluetooth-enabled Pocket PC device by simply inserting the memory card 74, and in general, without any additional configuration or software installation.

Once new data is collected by the Pocket PC 71, the new data can be integrated into a master database where other readings are stored. In some embodiments, this is done by synchronizing the Pocket PC device using software such as Microsoft's ActiveSync to transfer the data on the Pocket PC to a desktop or other computer where a master database is maintained.

Figure 21:
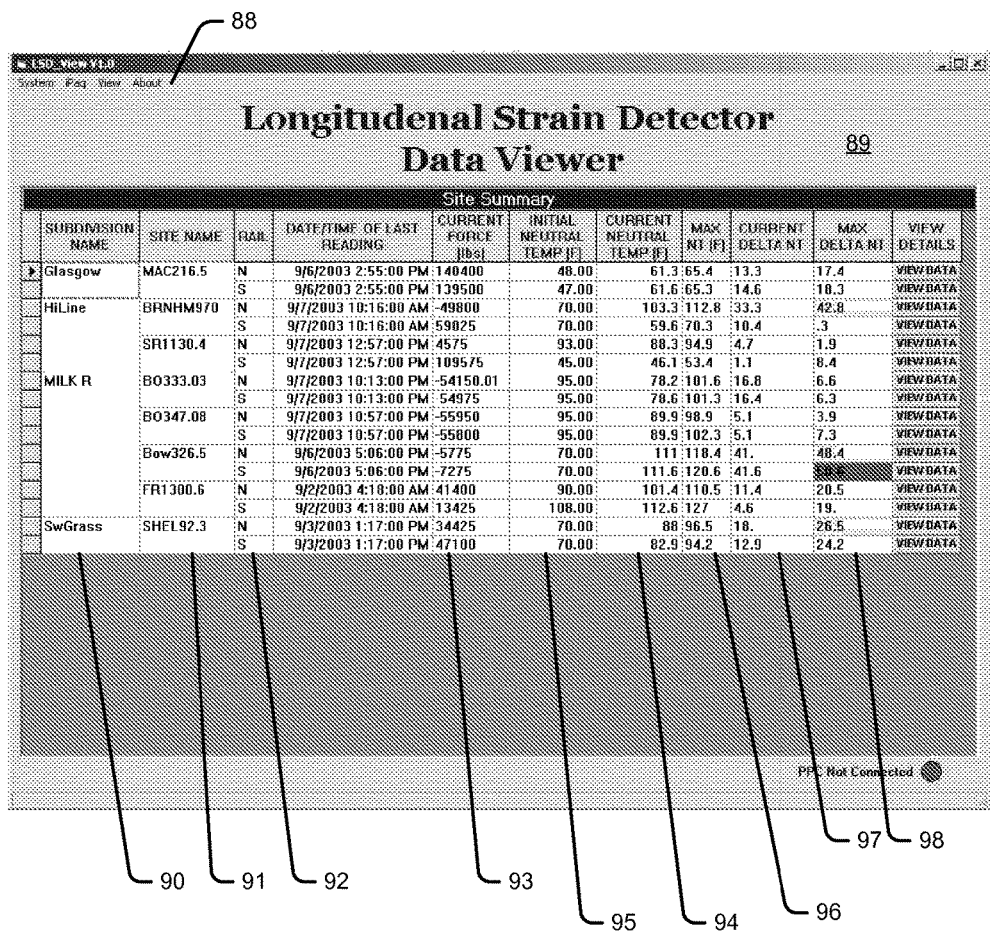
FIG. 21 is a screen display for a desktop data viewing and analysis application.

FIG. 21 shows a screen from a desktop application that can be used in an embodiment of the present invention to analyze the data collected from various field sensor systems. The application has a pull-down menu 88 and a data display area 89.

The data shown in the display area 89 in FIG. 21 relates to various readings from a number of field sensor systems deployed on a railroad. The subdivisions listed in the first column 90 identify a section of track, which may include one or more field sensor systems. The site name column 91 lists the identifier for each field sensor system located in the corresponding subdivision. Column 92 lists the date and time that a reading on each rail was last taken using a data collection device. The current force 93 and current neutral temperature 94 as calculated for the last data available for each site is also listed, along with the initial neutral temperature of the rail 95, which is determined when the rail was installed, or when the field sensor system was last or previously calibrated. The historical maximum neutral temperature is listed 96, along with the current difference (i.e., delta) 97 between the current neutral temperature 94 and the initial neutral temperature 95 are also shown for each of the two rails at each site. In addition, the difference between the maximum neutral temperature 96 and the initial neutral temperature 95 is also shown 98. Where certain data thresholds are met for some of the columns of data in FIG. 21, color or other visual indicia may be used to highlight data that may be of interest to the user, such as measurements that suggest a significant change in neutral temperature.

Figure 22:
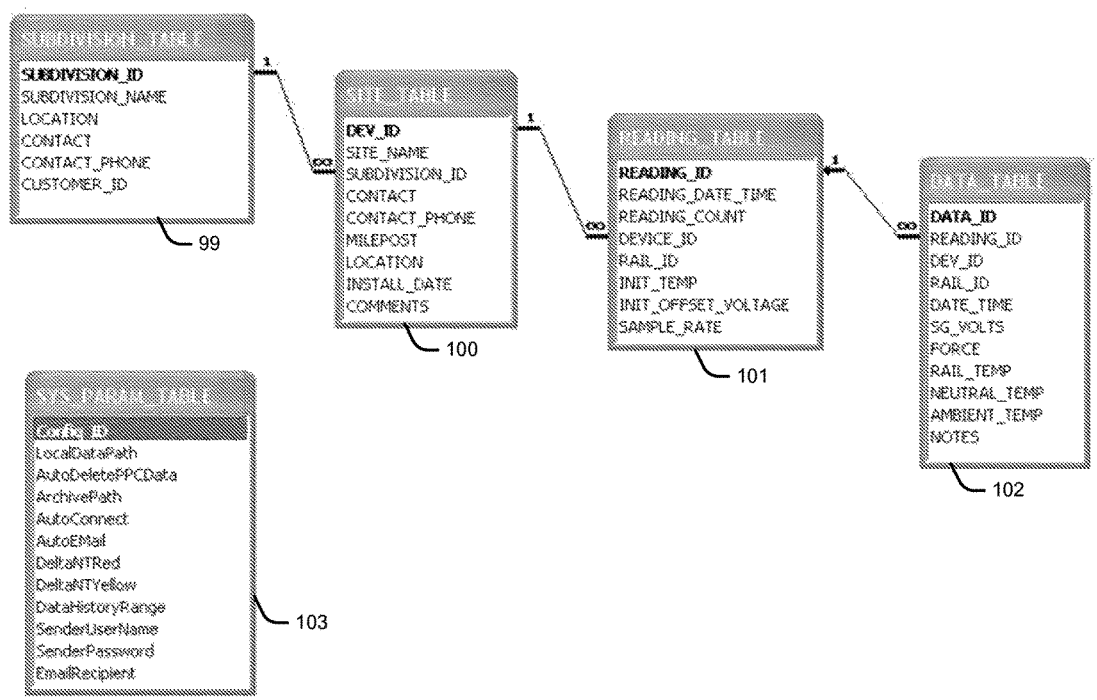
FIG. 22 is a diagram of a relational database.

The data shown in FIG. 21 is preferably taken from a relational database, such as the database represented by the diagram in FIG. 22. Shown in FIG. 21 are five tables 99, 100, 101, 102, and 103. Table 99 is used for storing a list of Subdivisions and characteristics associated with each Subdivision. Each Subdivision, which generally refers to a section of railway track, has a name, a location, and may have a contact person and phone number. Associated with each Subdivision may be one or more Sites, which are listed in the Sites table 100. For each Site, one or more Readings may be stored in the Readings table 101, and each Reading may have associated with it one or more data entries, which are stored in the Data table 102. A System Parameters table 103 is also shown in FIG. 22.

Figure 23:
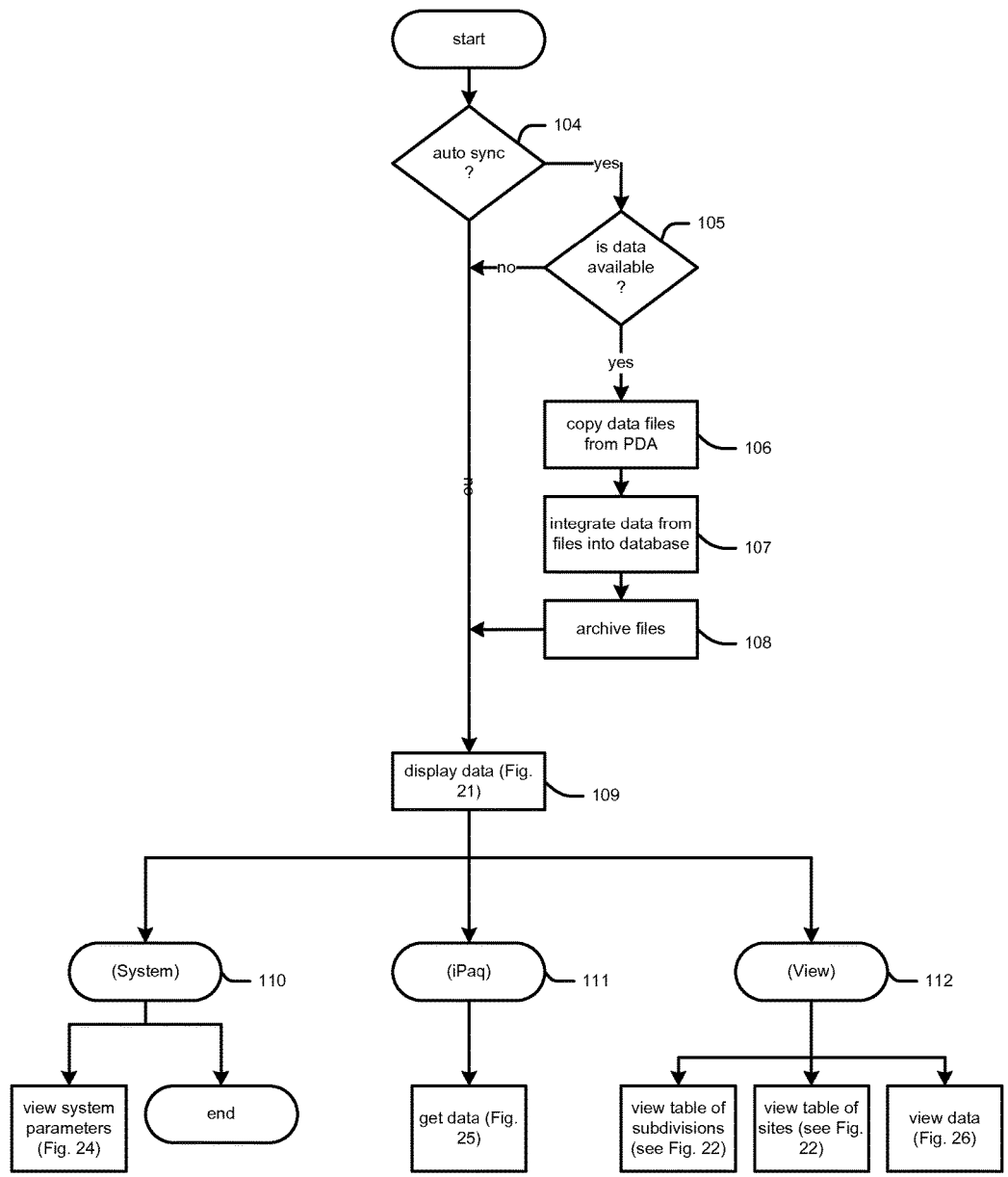
FIG. 23 is a flow chart of the operation of a data viewing and analysis application.

FIG. 23 is a flowchart of the operation of the desktop application of FIG. 21. When the application starts, and if the application is configured to automatically synchronize 104 any new readings from the Pocket PC, the Pocket PC is queried to determine whether any new data (typically in the form of data files or text files) is available 105. If any data is available, the data is copied from the Pocket PC to the desktop PC executing the desktop application 106. The data may then be integrated 107 into a database, such as the one illustrated in FIG. 22. The files may then be stored in an archival location on the PC or elsewhere 108, and the files may also be removed from the Pocket PC. During this process, the desktop PC user may receive visual or other confirmation as these steps are being completed.

When this auto sync process is completed (or if it is not enabled), the user is presented with a display such as that shown in FIG. 21 (see 109 in FIG. 23). The application window for the desktop application shown in FIG. 21 has a pull-down menu 88, which can be used to access a number of functions. The pull-down menu 88 includes a System menu 110, an iPaq menu 111, and a View menu 112, as represented in FIG. 23.

Figure 24:
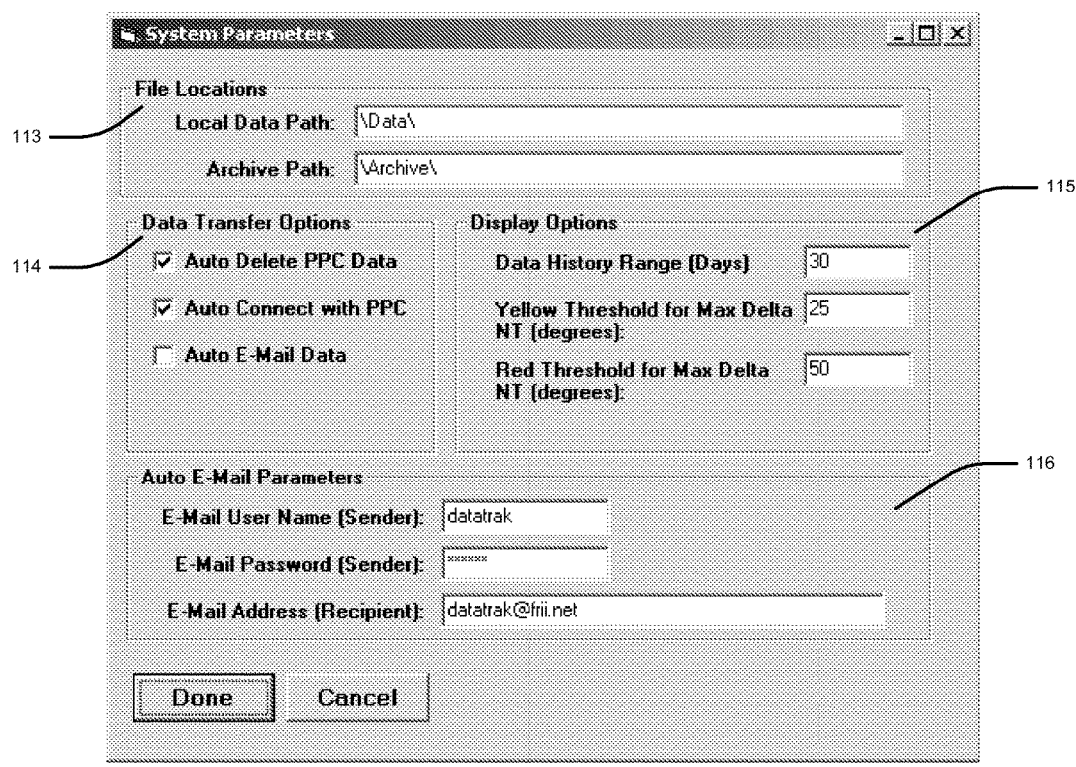
FIGS. 24, 25, and 26 are screen displays for a desktop data viewing and analysis application.

By selecting the System menu 110, the user may either view system parameters, which causes a dialog box such as that shown in FIG. 24 to appear, or the user may exit the program. The dialog box of FIG. 24 provides the opportunity to alter the way in which the desktop application of FIG. 23 operates. The user can modify the location where data files are stored or archived 113, and can modify the way data is transferred and otherwise handled 114. For example, the automatic synchronization feature (see 104 in FIG. 23) can be enabled in this dialog box, and data may be automatically deleted from the Pocket PC after transfer (see 106 in FIG. 23). In addition, the desktop application can be configured to send an email including some or all of the data to a desired email address. This can be carried out automatically, periodically, and/or when one or more of various conditions are met by the data. See 116 in FIG. 24. The dialog box of FIG. 24 also provides the ability to modify the data history range, or the number of days data is displayed in the display window of FIG. 26. Also, the color thresholds for the data displayed in FIG. 21 may also be configured in the dialog box of FIG. 24. See 115 of FIG. 24.

Figure 25:
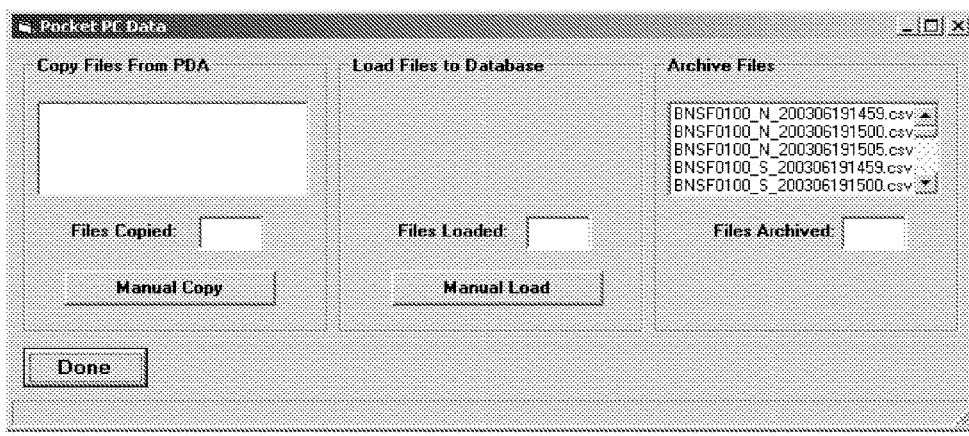

Selection of the iPaq menu 111 (iPaq is a popular Pocket PC device manufactured by Hewlett-Packard Company, and is used here synonymously with "Pocket PC"), causes a dialog box such as that shown in FIG. 25 to appear, which can be used to manually retrieve data from the Pocket PC, similar to the manner in which the data is retrieved through the synchronization procedure 105, 106, 107, and 108.

Figure 26:
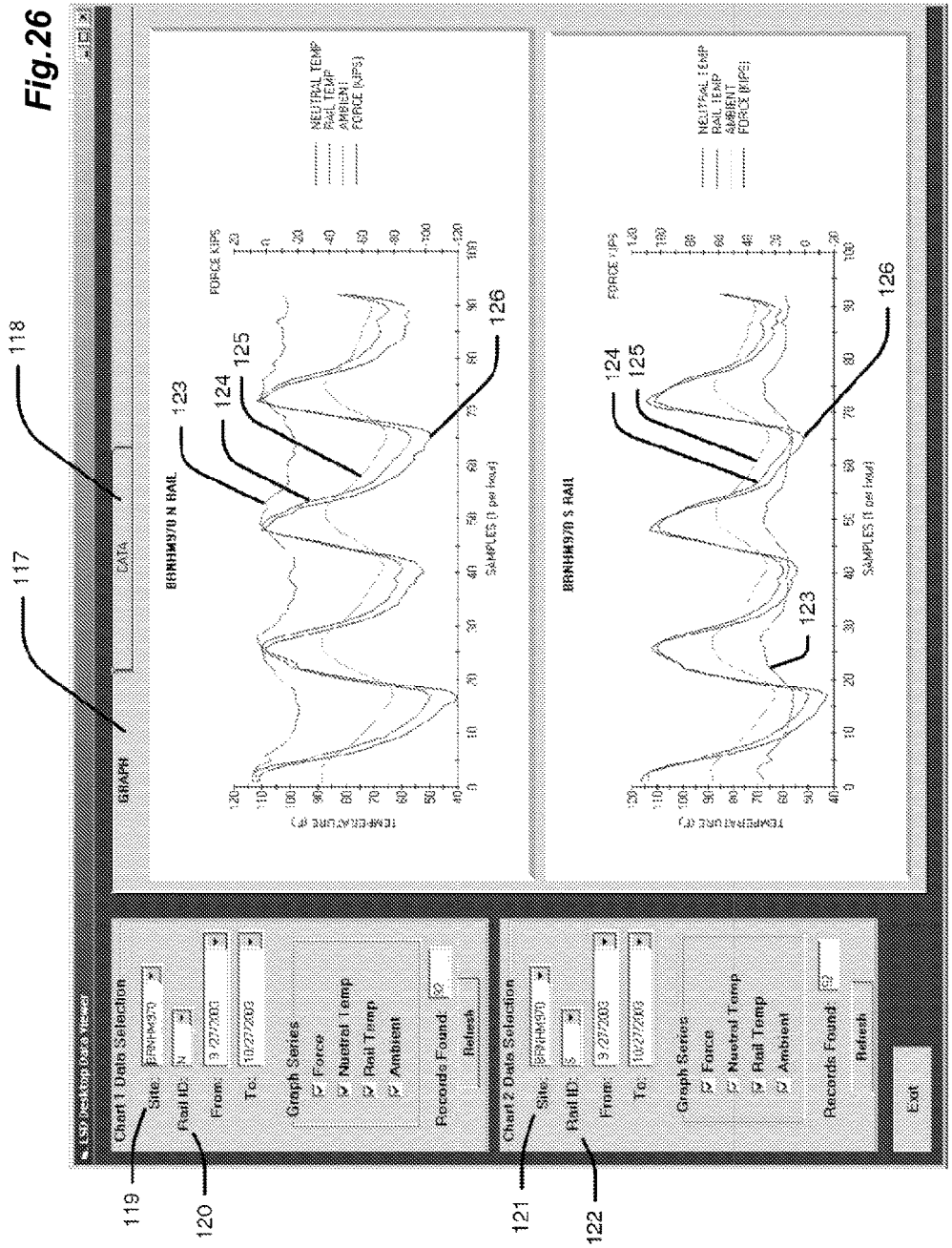

Selecting the View menu 112 provides the option to view the data in the Subdivisions and Sites tables, which are illustrated as part of the database in FIG. 22, and also to view and/or chart data from one or more sites in a manner shown in FIG. 26. The data viewing screen in FIG. 26 allows both the graphical display 117 and text-grid display 118 of data for two different rails. The rails displayed may simply be the north and south rails from the same Site, as is shown in FIG. 26, or the rails may from different sites. By selecting the Site drop down menus 119 and 121 and the Rail ID drop-down menus 120 and 122, the user can select the desired data for display. As shown in FIG. 26, graphs of the neutral temperature 123, the rail temperature 124, and the ambient temperature 125 over time may be displayed for each of the displayed rails. The force on the rail 126 may also be displayed, if desired.

Note that in FIG. 26, the neutral temperature of the track tends to vary over a twenty-four hour period, rising as the ambient temperature rises, and falling as the ambient temperature falls. Normally, rail is installed so that it is securely fastened to the ground, and is given little, if any, room to move. For a given portion of rail, if completely secured to the ground, the neutral temperature would, theoretically, not fluctuate during the day. However, where the neutral temperature does fluctuate, it may be an indication that the track has some room to relieve some axial forces that it is subject to, and presumably may not be completely secured. In some cases, a track may be insufficiently secured to the ground, or loose, which is a condition that can cause problems for railroads, and perhaps additional safety issues. Thus, it may be useful to monitor the extent to which the neutral temperature of a given track fluctuates during the day. And accordingly, by so monitoring, some of the embodiments and systems described herein may also be used to detect not only the internal forces in the rail, but also the extent to which the rail is securely attached to the ground.

Some of the data displayed herein is taken from experimental systems and test systems, and may not represent actual readings from any particular rail. Further, to the extent the data is from experimental systems and test systems, it should be understood that the data shown or described herein may not fall within ranges found in actual practice. Further, data shown in one figure may not be consistent with data shown in another figure, and this disclosure should be read by one skilled in the art by keeping mind that any data shown is merely illustrative.

Appendices A, B, and C are lists of files containing source code for three applications. Appendix A is a list of files from an application designed to execute on a data logger module (Adam-5510), and is written in C. Appendix B is a list of files for an application written in Microsoft Embedded Visual C++ that executes on a Pocket PC handheld device. Appendix B is a list of files for a Microsoft Windows desktop application written in Visual Basic. The software in these appendices can be used in a Pocket PC-based wireless neutral temperature measurement system, as is described herein, particularly in connection with FIG. 16 to FIG. 26.

The following description focuses on FIGS. 27-33. As such, the present disclosure provides an Automated Rail Inspection System comprised of the following components: 1. Rail Drone Automated Vehicle; 2. Rail Drone Control System; 3. Rail Inspection Sensors; 4. Global Positioning System; 5. Image Capturing System; 6. On Board Computer System; 7. Clearance Detection; 8. Data Storage System; 9. Communication System; 10. Cloud Based Data Storage System; 11. Web Based Graphical User Interface.

The Automated Rail Inspection System is placed onto the tracks by an operation crew. The vehicle will travel on the rails at a predetermined speed while communicating its current status (speed, position, health) with the operation crew in real time. While traveling on the rail, the system will use its sensor array to monitor various aspects of the rail environment. These aspects include, but are not limited to: 1. Rail Profile; 2. Rail Geometry; 3. Tie and Clip Status; 4. GPS Coordinates; 5. Visual Imagery; 6. Neutral Temperature of the Rail; 7. Radio Communication Status; 8. Infrared Imagery; 9. Clearance Above the Head of Rail; 10. Ground Penetrating Radar Scans.

The Automated Rail Inspection System will travel along the rail and collect data on a pre-determined section of track ranging in length from several miles to several hundred miles at which point it will rendezvous with the operation team and be removed from the rail and transported to its next job site via a standard highway trailer.

Figure 27:
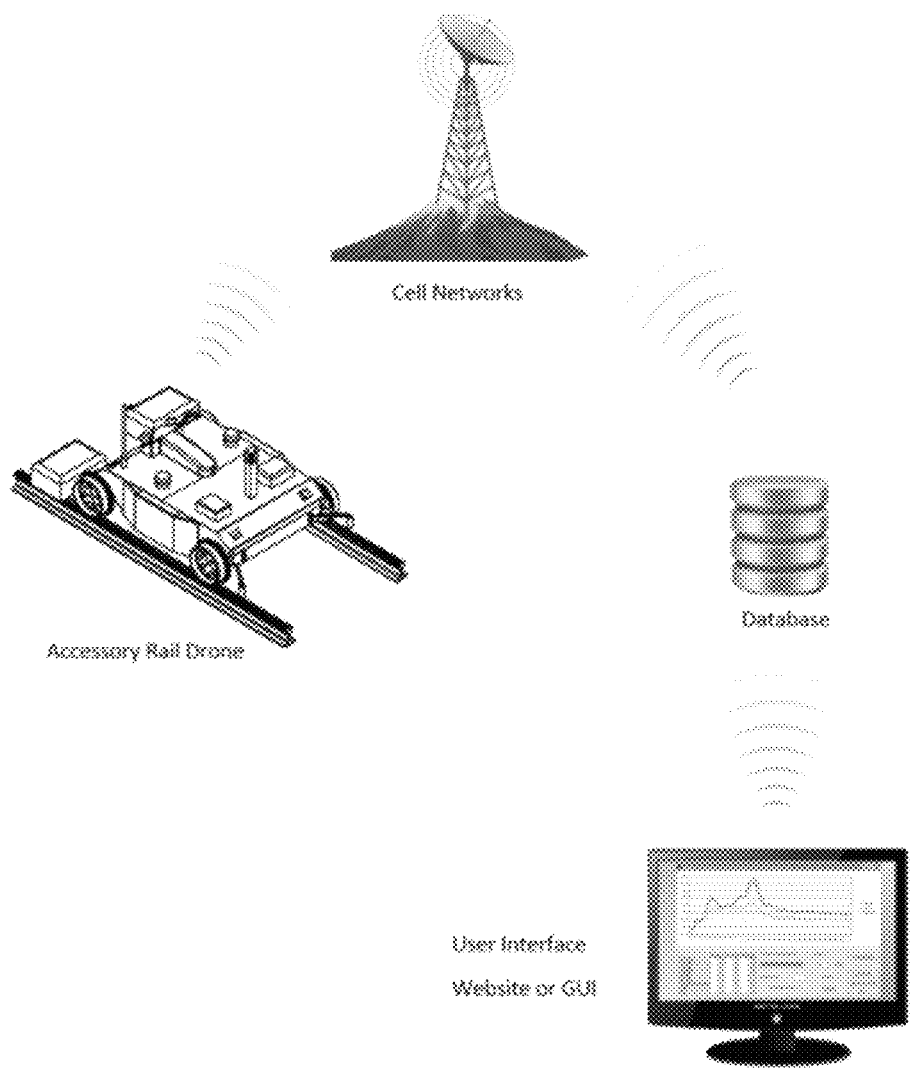
FIG. 27 includes an Automated Rail Inspection System Concept of Operations in accordance with embodiments of the present disclosure.
Figure 28:
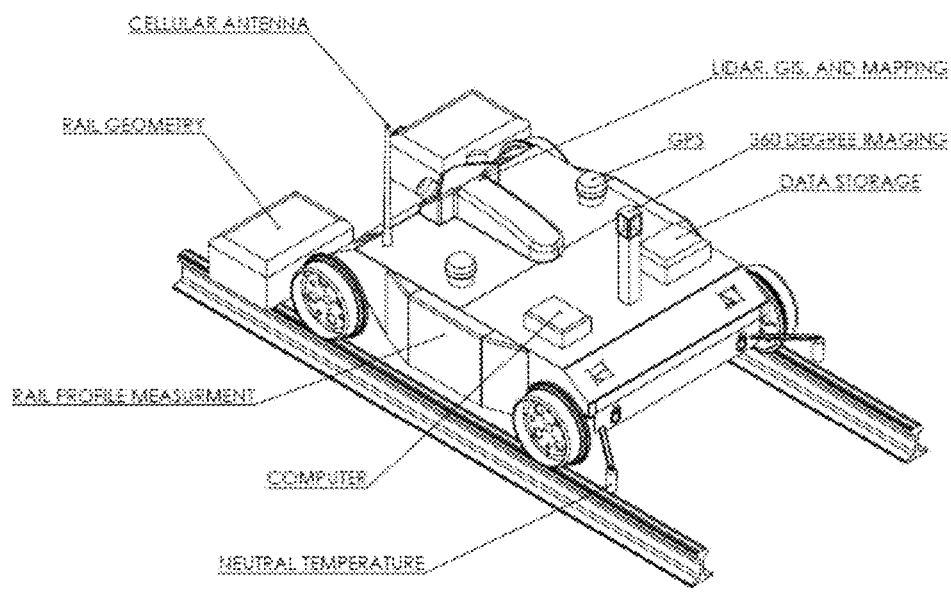
FIG. 28 illustrates Automated Rail Inspection Vehicle in accordance with embodiments of the present disclosure.

All of the data collected along the vehicles route will be transmitted to a centralized database (cloud) either in real time or near real time. Data will be transferred to the database via the cell phone network, satellite communications, Railroad Radio Frequencies, Wi-Fi or a combination of these methods. When communications are not available, the data collected will be stored on board until such a time when communications are re-established and the stored data can be offloaded. FIG. 27 shows a schematic representation of the concept of operations.

Data collected by the system will be transmitted and stored in a centralized, professionally hosted database. Software algorithms will process and analyze the data so that meaningful conclusions about the state of the rail environment can be calculated, stored and reported to the end user. Data will be accessed via a web based application. Users will login and then have access to the data for any section of track that has been measured by the system. Users will only see the data that they have contractual permission to view. Data from previous data collection dates for the same section of track can also be analyzed and viewed and compared by the user.

Sub System Descriptions and Capabilities
Rail Drone Automated Vehicle

The rail drone is an instrumentation platform that is designed to run on standard gage rail at speeds of up to 40 MPH. The vehicle consists of a frame, four wheels with standard railroad wheel profiles, a drive train, a power system and a control system. The vehicle's motor is electric and is powered by rechargeable batteries but could use a motor powered by fuel (gas, diesel, natural gas) if required. A schematic representation of the drone is shone in FIG. 28.

Capabilities include (a) The vehicle can run on standard gage rail at speeds of up to 40 MPH; (b) The vehicle can operate without an operator on the vehicle; (c) The vehicle has a set of removable rubber wheels which enables it to be moved on flat surfaces (roads); (d) The vehicle has an emergency stop button; (e) The vehicle has a warning light system; (f) The vehicle has an onboard computer which is used for control functions and vehicle status; (g) The vehicle can carry a payload of up to 1000 lbs; (h) The vehicle has on board accelerometers that will shut down the motors if the vehicle derails or strikes an obstacle.

Rail Drone Control System

The rail drone's control system has two modes of operation: 1) remote control mode and 2) autonomous mode.

In remote control mode, the vehicle is in constant communications with a controlling computer (such as a laptop) which provides the motor controlling commands. The controlling computer runs software that communicates with software running on the vehicle's onboard computer. The controlling computer has a user interface which allows the user to control the vehicle and displays vehicle status to the user such as speed and position. The vehicle communicates with the controlling computer using radio communication. If the vehicle ever loses its connection with the controlling computer it will automatically stop.

In autonomous mode the vehicle will receive general commands from the controlling computer but will then proceed under its own command logic computed on the onboard computer. The onboard computer will constantly monitor information about its environment and will stop the vehicle if it perceives an unsafe situation. It will provide vehicle status to a monitoring computer application if communication is available. If communication is not available, the vehicle will continue with its pre-defined instructions and store vehicle health information onboard.

Capabilities include (a) Control system is able to control vehicle for unmanned rail inspection; (b) Redundant communication methods for safety; (c) Able to monitor and report vehicle status and health; (d) Able to alter vehicle speed or stop vehicle autonomously.

Rail Inspection Sensors

The Automated Rail Inspection System has the ability to make the following rail measurements.

Rail Geometry

The system will have sensors on board capable of measuring rail geometry including, but not limited to (a) Gage; (b) Track Elevation; (c) Track Cant; (d) Track Ripples.

Commercially available technology will be integrated into the inspection system's design. The design will also support the integration of other rail geometry sensor platforms as new rail geometry inspection technology becomes available.

Capabilities include (a) Data related to rail geometry will be collected and stored; (b) Data readings will be collected and correlated with GPS coordinates as well as track mile markers; (c) Data readings from one collection period will be stored and can be directly compared with data taken from subsequent or past collection periods.

Rail Profile

The Automated Rail Inspection System has will have sensors on board capable of measuring rail profile including, but not limited to: (a) Gage Face Wear; (b) Top Face Wear; (c) Material Movement; (d) Shelling.

Commercially available technology will be integrated into the inspection system's design. The design will also support the integration of other rail profile sensor platforms as new rail profile inspection technology becomes available.

Capabilities include (a) Data related to measuring rail profile will be collected and stored; (b) Data readings will be collected and correlated with GPS coordinates as well as track mile markers; (c) Data readings from one collection period will be stored and can be directly compared with data taken from subsequent or past collection periods.

Neutral Temperature

The Automated Rail Inspection System will have sensors on board that are capable of determining the amount of stress currently in the rail. This information, along with the track temperature, can be used to calculate rail neutral temperature. Neutral temperature is the temperature at which the rail is neither in tension nor compression. Neutral temperature is a convention used by the railroads to keep track of stress present in the rail as the ambient temperature fluctuates. Too much compressive stress can cause the rail to buckle, too much tension and the rail can break.

The Automated Rail Inspection System will employ ultrasonic wave analysis to determine the current stress in the rail. Ultrasonic energy will be transmitted into the rail using non-coupled (no contact) Electromagnetic Acoustic Transducers which are capable of sending polarized waveforms into the rail. Two polarized, orthogonal wave forms are transmitted into the rail and the time it takes the reflections from those initial pulses to reach ultrasonic receivers is used to calculate the speed of sound in the material. One polarized wave form is aligned longitudinally along the rail, the other is aligned perpendicular to the gage face. The stress along the axis perpendicular to the gage face is assumed to be zero. The stress along the longitudinal axis of rail can then be computed by comparing the speed of sound along each axis. Since the material properties will be identical for each axis measured, any differences in the speed of sound between the two orthogonal measurements can be attributed to the amount of stress in the longitudinal direction.

Information gathered from the rail profile measurement system will also be used as an input to the speed of sound calculation to increase accuracy of the measurements.

Capabilities include (a) Neutral Temperature measurement system will be able to measure absolute neutral temperature for long stretches of track without the need for cutting the rail or unclipping the rail; (b) Neutral temperature will be calculated without the need to couple the sensor to the rail; (c) The neutral temperature measurement system will incorporate rail profile measurements, increasing accuracy; (d) Neutral Temperature drift can be monitored when current readings are compared with previous readings.

Global Positioning System

The Automated Rail Inspection System will have a Global Positioning System on board which will measure and store the GPS coordinates at all points along the inspection route. All other measurements will be correlated to these GPS coordinates so that data can be spatially mapped and compared with other readings taken at different time periods.

Capabilities include (a) Measure GPS coordinates along the entire inspection route; (b) All other measurements will be correlated to these simultaneously collected GPS coordinates.

Image Capturing System

The Automated Rail Inspection System will have a system onboard for collecting visual images over the inspection route. These images will be correlated with GPS coordinates collected at the same time. The captured images can be used to identify the exact location of railroad equipment such as mile-markers, signs and notifications, signals, turnouts, sidings, etc. It can also be used to spot any damaged or missing railroad equipment listed above.

Capabilities include (a) Collect images along all inspection routes similar to those used by google earth; (b) Correlate these images to simultaneously collected GPS coordinates for mapping and reference; (c) Compress and store these images such that they can be efficiently transferred back to a database for permanent storage.

Clearance Detection

The Automated Rail Inspection System will have a system onboard that uses laser scanning technology to measure how much clearance is available above the height of the rail. This is useful for the railroads in order to identify bridge clearances, tunnel clearances, tree clearances, etc. along a particular route.

Capabilities include (a) Measure clearances in an area surrounding the rails up to approximately 30 ft; (b) Measurements are accurate to at least +/− one inch; (c) Correlate all measurements with simultaneously collected GPS coordinates.

On Board Computer System

Figure 29:
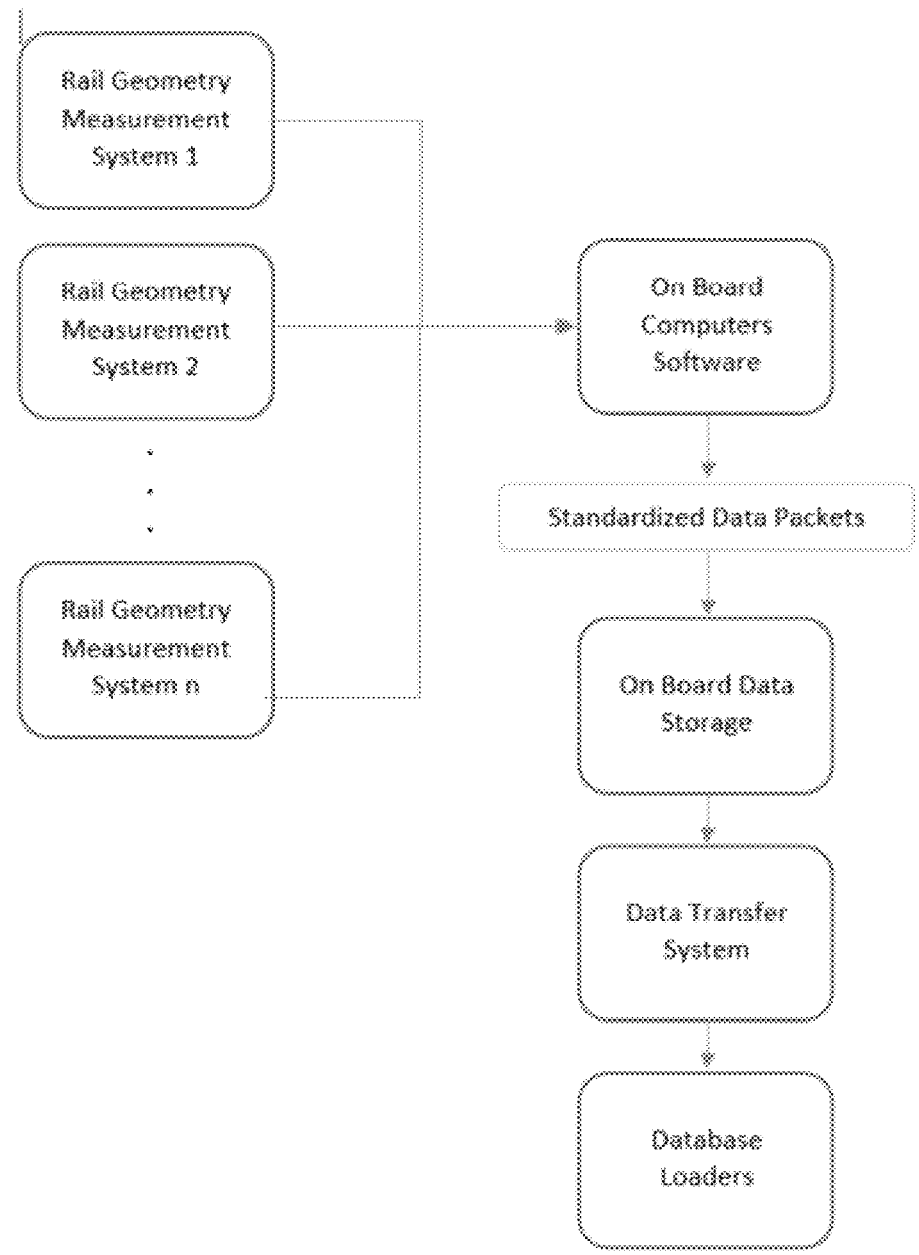
FIG. 29 illustrates Data Standardization in accordance with embodiments of the present disclosure.

The on board computer system will be responsible for coordinating and commanding all of the measurement systems on the Automated Rail Inspection System. It will then organize the data in a predesigned format that can be compressed and transmitted back to a centralized database. Data will be organized into standardized packets that will enable the data to be easily loaded into the database. This will also enable different sensor platforms to replace each other without affecting all of the data formats upstream. A schematic of the onboard data transfer design is shown in FIG. 29.

Capabilities include (a) The on board computer will synchronize and command all of the other measurement platforms on the vehicle; (b) The on board computer will synchronize the data with GPS data collected at the same time; (c) The on board computer will provide any real time or near real time data analysis needed by any of the measurement platforms; (d) The on board computer will package the incoming data into pre-designed data packets that will then be sent onto the centralized database for storage; (e) Different sensor platforms that measure the same parameters can be easily integrated into the system because the on board computer will populate the data into standardized packets.

Data Storage System

A data storage system capable of storing the large amount of data generated by the system will be on board the vehicle. The on board computer will package up the data generated by the measurement platforms and send it on to the data storage system for storage. If communications are available, the data will then be sent onto the centralized database. If communications are not available, the data will continue to be stored in the Data Storage System until communications become available or the data is removed by other means.

Capabilities include (a) Store all of the data collected by the system until such a time when it can be reliably transmitted to the centralized database; (b) Delete any data that has been verified as successfully sent.

Communication System

Figure 30:
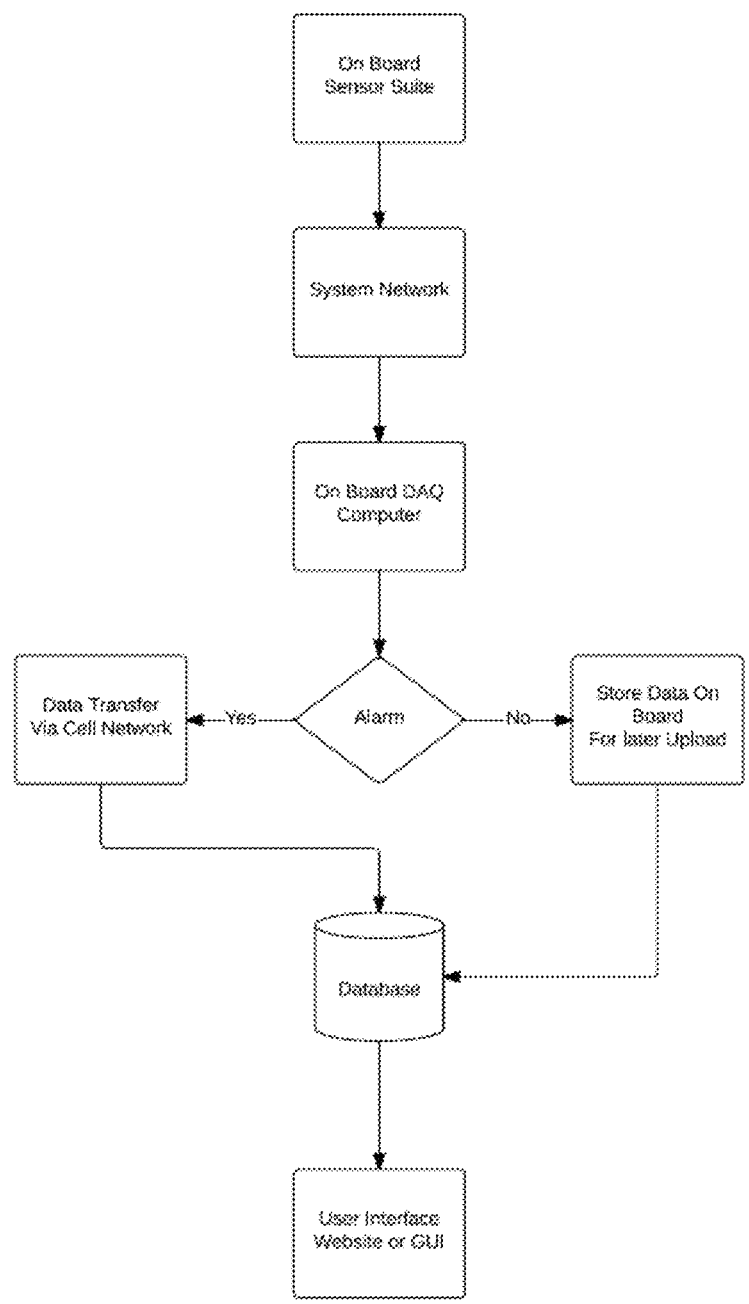
FIG. 30 illustrates Data Transmission Logic in accordance with embodiments of the present disclosure.
Figure 31:
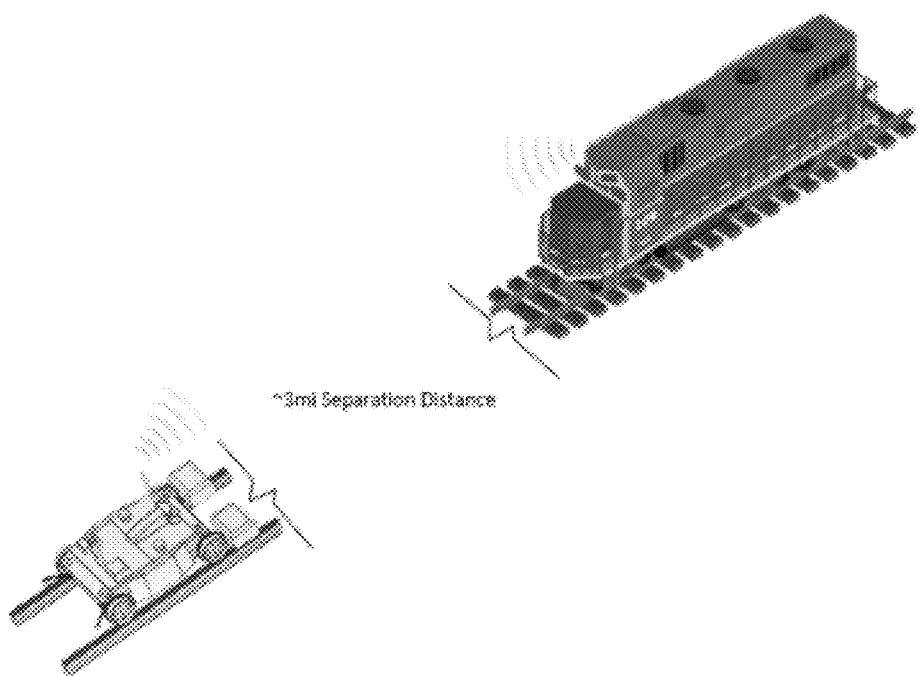
FIG. 31 illustrates a Scout Mode in accordance with embodiments of the present disclosure.
Figure 32:
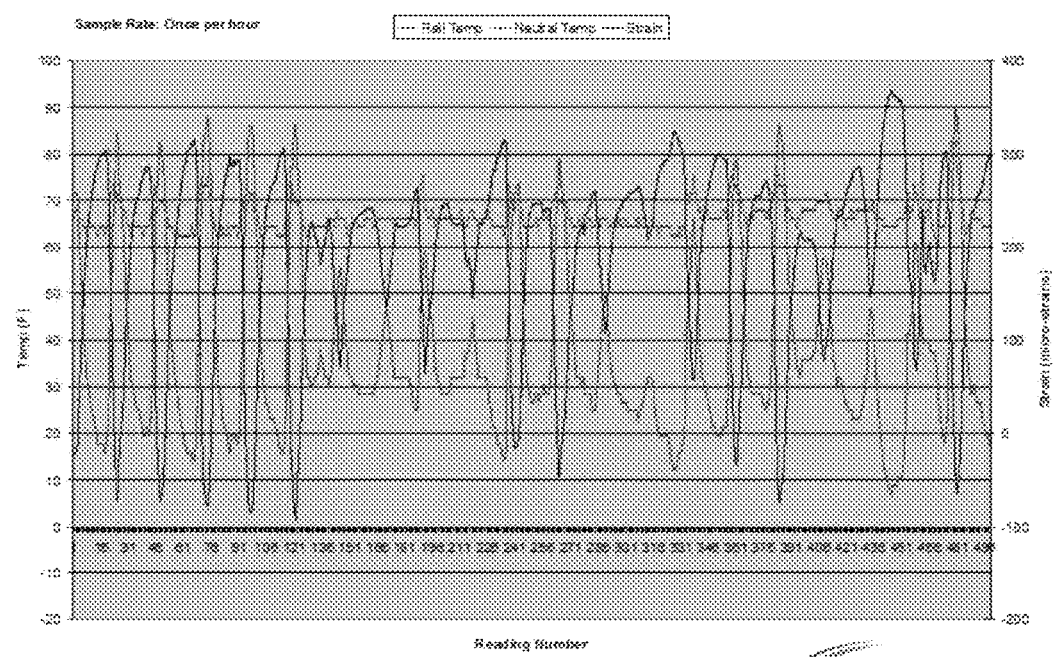
FIG. 32 illustrates typical neutral temperature data when sampled once per hour in accordance with embodiments of the present disclosure.
Figure 33:
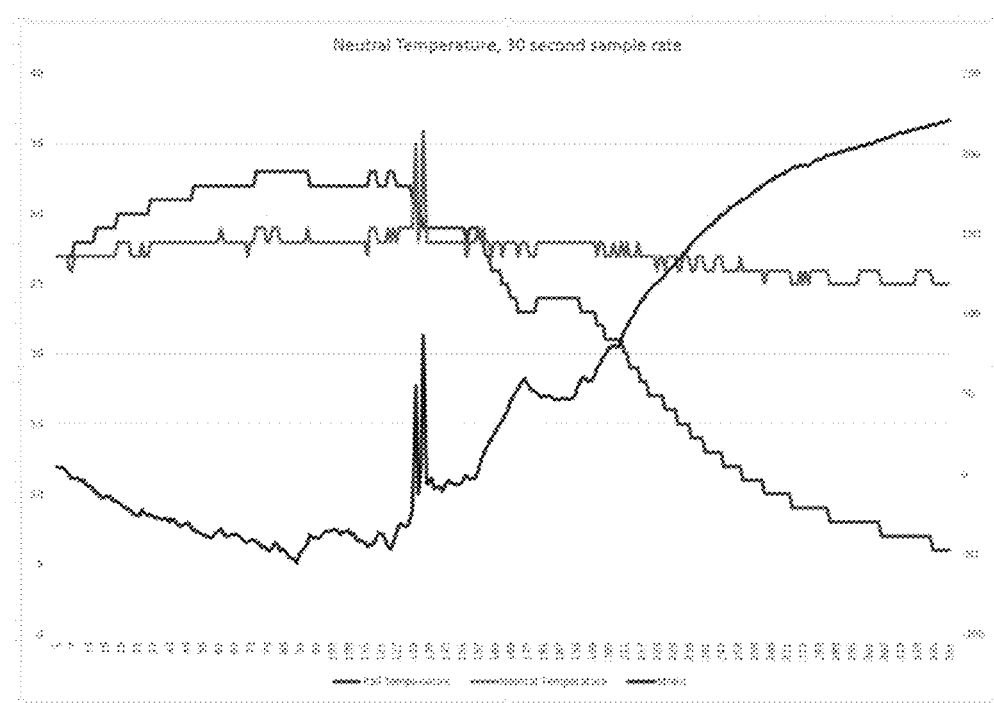
FIG. 33 illustrates neutral temperature data when sampled once per 30 seconds in accordance with embodiments of the present disclosure.

The Automated Rail Inspection System will have the ability to send data to a centralized database via the internet. Standard cellular modems will be used whenever possible. Other communication methods such as data radios or Wi-Fi may also be used in territories where cell coverage is unavailable. FIG. 30 shows a schematic of the data transfer logic.

Capabilities include (a) The communication system will employ multiple data transfer technologies to ensure flexibilities and redundancies; (b) The communication system will have systems in place that can automatically switch between the different data paths available to ensure seamless data flow. For example, the cellular data modem will have the ability to switch between multiple carriers depending on which carrier is available at any given location.

Cloud Based Data Storage System

All data collected by the Automated Rail Inspection System will be stored in a centralized, professionally hosted database server. The database storing the data will be redundant, secure and fully scalable to handle the large amount of data that could potentially flow into the system. The database will be maintained by a full time team of developers and database administrators.

Capabilities include (a) All data is stored in a professionally hosted, cloud based server platform; (b) All databases and servers are fully secure; (c) All databases and servers are fully scalable; (d) All databases are monitored and maintained by a dedicated staff.

Web Based Graphical User Interface

All data stored in the database will be made available to end users via web based graphical user interface. End users will access the web site via any web browser and will log into a secure connection using a user name and password. Users will only have access to data that they have permission to view.

Algorithms running on the database server analyze the data coming in from the multiple sensors on board the vehicle and are capable of integrating this information to provide the users additional information that would not be available from just one set of measurements. The algorithms are also capable of analyzing historical measurements taken for the same section of track and can give the user information based on trends discovered by comparing one dataset to another. These algorithms give the users more value than they would be able to get from just one set of measurements from one measurement sensor.

Users will be able to view data from multiple sensors, over multiple measurement periods in a graphical format. Users will also be able to define custom alarms based on criteria that they can define. Alarms and warnings will be displayed on the web interface. Alarms and warnings can also be sent out via emails to a predefined list of recipients.

Capabilities include (a) Users will be able to view all data collected by the Automated Rail Inspection System via a Web Based Application; (b) Users will log in via a user name and password and will only be able to view data they have permission to view; (c) Users will be able to view data from multiple sensors on the same graph or grid; (d) Users will be able to view data from multiple measurement events (historical data) on the same graphs or grids; (e) Algorithms will analyze data from multiple sensors to make intelligent decisions about the current state of the rail and report this information to the end user; (f) Algorithms will be able to compare sensor readings from multiple measurement events (historical measurement events) to make intelligent decisions about the current state of the rail and report this information to the end user.

Other Use Case Scenarios

In this Scout mode the Automated Rail Inspection System is used much as previously described, however instead of being controlled from a remote computer, it is controlled from the cab of a locomotive. The drone would run 2-3 miles in front of the locomotive and alert the locomotive if any hazardous conditions existed, such as broken rails, buckled track or anything fouling the track.

Hazardous Environment Inspection

The Automated Rail Inspection System is used to remotely enter a potentially hazardous environment such as a hazardous chemical spill or the location of a recent fire and determine if the area is safe for safety crews to enter.

Calibration Method for Strain Gage Based Neutral Temperature Measurement Systems A method is provided to automatically calibrate strain gage based neutral temperature sensors. Typically, neutral temperature measurements can be collected several times in a 24 hour period to give the user adequate information about the current neutral temperature. Neutral temperature does not change fast enough to require readings any more frequently than that. However, if strain is measured at a much higher sample rate, once every 30 seconds for example, an interesting event takes place when the rail moves through the neutral temperature (zero stress state). Below is a graph of what typical neutral temperature data looks like when sampled once per hour.

The red line is rail temperature (left hand axis) the blue line is rail strain (right hand axis) and the green line is the computed neutral temperature. Notice that strain and temperature are inversely proportional to each other. The neutral temperature remains relatively constant as the strain changes due to the change in temperature of the rail.

Now look at some neutral temperature data sampled once every 30 seconds.

Notice that when the strain goes through zero while moving from compression into tension, the strain spikes up and down for several minutes. These changes in strain are not due to change in temperature.

Algorithms that search for these spikes that are not related to rail temperature. When this effect is seen, the system knows that the rail is in its zero stress state and the strain gage can be calibrated (the offset computed) at that instant. All subsequent readings will be absolute strain.

The sensor must also be capable of distinguishing these spikes from other spikes or noise collected by the sensor. Spikes from a train passing over the sensor, for example.

Each time this effect is seen by the sensor, the system can be re-calibrated, eliminating the long term effects of strain gage "drift", a common occurrence in strain gage measurements.

By deploying sensors along a section of rail and monitoring those sensors on a frequency that is high enough to gather the data at the transition of compression to tension or tension to compression Neutral temperature for a given section can be determined and the sensors calibrated automatically for futures determinations of stress and tension in that section of rail.

By using an "Overwrite" methodology minimal data is accrued such that only the data relevant to the point of transition is stored and used, keeping the need for data storage to a minimum.

The routine of measuring at high frequency is used periodically to verify and calibrate new sections of rail or sections of rail that have been repaired or are old and have never previously been monitored.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of mitigating long term effects of strain gage drift, the method comprising:
 a) receiving a plurality of strain measurements from a strain gage positioned on a rail at a data acquisition module of a field sensor system, the data acquisition module electrically connected to the strain gage, the plurality of strain measurements being sampled at a sampling rate and including a strain spike experienced when the rail transitions from tension to compression or compression to tension in a longitudinal direction due to thermal deformation;
 b) identifying, via a microprocessor of the field sensor system, a particular strain measurement from the plurality of strain measurements corresponding to the strain spike, the microprocessor in communication with the data acquisition module;
 c) comparing, via the microprocessor, the strain spike to other spikes in the plurality of strain measurements to ensure the strain spike corresponds with the rail transitioning from tension to compression or compression to tension in a longitudinal direction due to thermal deformation;
 d) calibrating, via the microprocessor, the strain gage based on the particular strain measurement; and
 e) re-calibrating the strain gage based on a subsequent performance of steps a), b), c), and d).

2. The method of claim 1, wherein calibrating comprises computing an offset value for the strain gage.

3. The method of claim 1, wherein the sampling rate is about one sample every thirty seconds, one sample every twenty seconds, one sample every ten seconds, or one sample every minute.

4. The method of claim 1, wherein the spike is an abnormality in strain that is not related to rail temperature.

5. The method of claim 1, wherein the other spikes include strain spikes resulting from a passing railcar.

6. The method of claim 1, wherein the step of comparing the strain spike to other spikes includes a comparison of amplitude and duration.

7. The method of claim 1, further comprising: calculating neutral temperature of the rail based on the particular strain measurement.

8. The method of claim 1, further comprising coupling the strain gage to a web of the rail.

* * * * *